(12) United States Patent
Ikeda et al.

(10) Patent No.: US 7,698,484 B2
(45) Date of Patent: Apr. 13, 2010

(54) INFORMATION PROCESSOR CONFIGURED TO DETECT AVAILABLE SPACE IN A STORAGE IN ANOTHER INFORMATION PROCESSOR

(75) Inventors: Junichi Ikeda, Miyagi (JP); Koji Oshikiri, Miyagi (JP); Noriyuki Terao, Miyagi (JP); Atsuhiro Oizumi, Miyagi (JP); Yutaka Maita, Miyagi (JP); Satoru Numakura, Miyagi (JP); Hiroo Kitagawa, Kanagawa (JP); Tomonori Tanaka, Kanagawa (JP); Hiroyuki Kimbara, Kanagawa (JP); Hidetake Tanaka, Tokyo (JP); Iwao Hamaguchi, Kanagawa (JP); Keiichi Iwasaki, Kanagawa (JP); Toshihiro Tsukagoshi, Kanagawa (JP); Naoki Tsumura, Kanagawa (JP)

(73) Assignee: Ricoh Co., Ltd., Tokyo (JP)

( * ) Notice: Subject to any disclaimer, the term of this patent is extended or adjusted under 35 U.S.C. 154(b) by 114 days.

(21) Appl. No.: 11/523,054

(22) Filed: Sep. 19, 2006

(65) Prior Publication Data

US 2007/0067551 A1    Mar. 22, 2007

(30) Foreign Application Priority Data

Sep. 21, 2005    (JP)    ............... 2005-274608
Sep. 21, 2005    (JP)    ............... 2005-274609

(51) Int. Cl.
*G06F 13/00*    (2006.01)
*G06F 3/00*    (2006.01)
*G06F 15/173*    (2006.01)

(52) U.S. Cl. ............... 710/104; 710/17; 710/315; 709/216; 709/226; 711/147; 707/120

(58) Field of Classification Search ............... 709/216, 709/226
See application file for complete search history.

(56) References Cited

U.S. PATENT DOCUMENTS 5,623,641 A * 4/1997 Kadoyashiki ............... 711/171

(Continued)

FOREIGN PATENT DOCUMENTS

JP    2001-016382    1/2001

(Continued)

OTHER PUBLICATIONS

ASISIG—"PCI Express and Advanced Switching: Evolutionary Path to Revolutionary Architectures"—10 pages, retrieved Feb. 29, 2008.*

(Continued)

*Primary Examiner*—Mark Rinehart
*Assistant Examiner*—Brian T Misiura
(74) *Attorney, Agent, or Firm*—Harness, Dickey & Pierce, P.L.C.

(57) ABSTRACT

An information processor that is connected to at least one other information processor via a network, includes a detecting unit that detects an optional device to be used for information processing, as a target optional device, installed on the other information processor, an issuing unit that issues an access request to use the target optional device to the other information processor, a receiving unit that receives an access permission for access to the target optional device from the other information processor, and a processing unit that performs the information processing with the target optional device.

14 Claims, 33 Drawing Sheets

U.S. PATENT DOCUMENTS

| | | | | |
|---|---|---|---|---|
| 5,964,851 | A * | 10/1999 | Ueda | 710/17 |
| 6,898,634 | B2 * | 5/2005 | Collins et al. | 709/226 |
| 7,219,183 | B2 * | 5/2007 | Pettey et al. | 710/316 |
| 7,222,290 | B2 * | 5/2007 | Guo et al. | 714/811 |
| 7,225,284 | B2 * | 5/2007 | Rangarajan et al. | 710/266 |
| 7,350,014 | B2 * | 3/2008 | Kapoor et al. | 710/308 |
| 2003/0172146 | A1 * | 9/2003 | Collins | 709/223 |
| 2006/0004837 | A1 * | 1/2006 | Genovker et al. | 707/102 |
| 2006/0114918 | A1 * | 6/2006 | Ikeda et al. | 370/408 |
| 2006/0206647 | A1 * | 9/2006 | Stahl et al. | 710/301 |
| 2006/0206655 | A1 * | 9/2006 | Chappell et al. | 710/315 |
| 2007/0067432 | A1 * | 3/2007 | Tarui et al. | 709/223 |
| 2007/0211746 | A1 * | 9/2007 | Oshikiri et al. | 370/437 |

FOREIGN PATENT DOCUMENTS

| | | |
|---|---|---|
| JP | 2003-208271 | 7/2003 |
| JP | 2005-148896 | 6/2005 |

OTHER PUBLICATIONS

PCI Express Base Specification Revision 1.0a—Apr. 15, 2003, 4 pages.*

PCI Express Base Specification Revision 1.0a—Apr. 15, 2003, 428 pages.*

"Outline of the PCI Express Standard". Takashi Satomi. Chapter 4: The Standard of High Speed Extension Bus in Future, Jul. 2003.

* cited by examiner

FIG.14 (Conventional Art)

| STATE | CONDITION | EXPENDED TIME FOR RETURNING TO L0 |
|---|---|---|
| L0 | ACTIVE (NORMAL) | |
| L0s | LINK IS SET AT COMMON MODE VOLTAGE<br>BOTH CLOCK AND MAIN POWER SET ON | 16 ns TO 4 μs |
| L1 | LINK IS SET AT COMMON MODE VOLTAGE<br>CLOCK SETS OFF AND MAIN POWER SETS ON | ONE TO SEVERAL TENS OF MICRO SECOND |
| L2 | BOTH CLOCK AND MAIN POWER SET OFF<br>SUPPLY VOLTAGE IF ANY AUXILIARY POWER (VAUX) | DEPENDENT ON SYSTEM |

EXPENDED TIME FOR RETURNING FROM L2 TO L0 DEPENDS ON RISING TIME OF POWER AND PLL.

FIG.15 (Conventional Art)

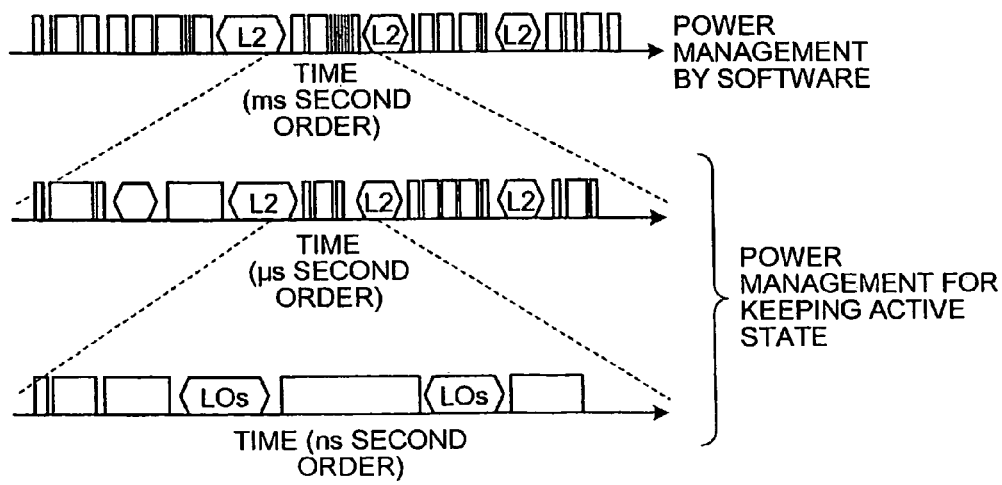

FIG.34    (Conventional Art)

INFORMATION PROCESSOR CONFIGURED TO DETECT AVAILABLE SPACE IN A STORAGE IN ANOTHER INFORMATION PROCESSOR

CROSS-REFERENCE TO RELATED APPLICATIONS

The present document incorporates by reference the entire contents of Japanese priority document, 2005-274608 filed in Japan on Sep. 21, 2005 and 2005-274609 filed in Japan on Sep. 21, 2005.

BACKGROUND OF THE INVENTION

1. Field of the Invention

The present invention relates to an information processor.

2. Description of the Related Art

In an information processor such as a digital copier and a Multifunction Product (MFP) that processes, for example, image data, a Peripheral Component Interconnect (PCI) bus is used as an interface between devices as shown in FIGS. 34 and 35. However, due to racing, skew, etc., a parallel PCI bus cannot provide a high data transfer rate sufficient for use in an image-forming device required to operate at a high speed and also to produce high quality images. Therefore, high-speed serial interfaces such as Institute of Electrical and Electronics Engineers (IEEE) 1394 interface and Universal Serial Bus (USB) are now studied to be used instead of the parallel PCI bus. For example, Japanese Patent Application Laid-Open No. 2001-016382 has proposed a technique using a high-speed serial interface such as the IEEE 1394 interface or the USB as an internal interface.

As another high-speed serial interface, the PCI Express (trademark), which is a successive version of the PCI bus, has been proposed and is now available for the practical use. Reference may be had to, for example, an article by Takashi Satomi "Outline of the PCI Express standard" taken from journal "Interface", July 2003. A PCI Express system is configured as a data communications network with a tree structure, including a root complex, a switch, and devices as shown in FIG. 1 of the article.

Information processors such as the MFP have an option slot that allows for a variety of functions according to necessity in addition to the basic components including a scanner and a plotter. More specifically, as shown in FIG. 34, optional boards for all necessary functions are installed in the option slot in, for example, an internal bus of the information processor. A plurality of information processors each having a different optional board can be used to enable a user to select the suitable one according to the purpose.

However, if optional boards for all necessary functions are installed in each information processor as shown in FIG. 34, the information processor requires higher costs.

To use a plurality of information processors each having a different optional board, the user is forced to conduct cumbersome operations, such as walking to a place where installed is an information processor with an optional board having a function which the user needs, moving each information processor to another place, or installing a plurality of drivers for connecting a computer and switching the drivers.

In addition, the information processor like the MFP that includes, for example, a scanner, a plotter, and a controller further includes a storing device such as a memory or a Hard Disk Drive (HDD) for temporarily storing a large amount of image data. The storing device is used for storing backup data for jam recovery on printing by the plotter, and image data for a plurality of pages on integrated printing, electronic sorting, or producing a composite image.

The larger the capacity of the storing device, the more image data the image processing device can process at a time. In other words, by increasing the capacity of the storing device, the performance of the information processor, such as integrated printing, can be enhanced. Therefore, to acquire a higher processing performance, an extra HDD or memory is added to an information processor.

However, an increase in the capacity of the storing device by adding a memory and a HDD results in higher cost of the information processor. Besides, the number of memories which can be added to one information processor is limited depending on the number of expansion slots available or a free space.

SUMMARY OF THE INVENTION

It is an object of the present invention to at least partially solve the problems in the conventional technology.

According to an aspect of the present invention, an information processor that is connected to at least one other information processor via a network, includes a detecting unit that detects an optional device to be used for information processing, as a target optional device, installed on the other information processor, an issuing unit that issues an access request to use the target optional device to the other information processor, a receiving unit that receives an access permission for access to the target optional device from the other information processor, and a processing unit that performs the information processing with the target optional device.

According to still another aspect of the present invention, an information processor that is connected at least one other information processor that includes a storage unit via a network, includes a free-space detecting unit that detects available space in the storage unit of the other information processor, a request issuing unit that issues an access request to use the available space to the other information processor, a permission receiving unit that receives an access permission for access to the available space from the other information processor, and an information processing unit that performs information processing using the available space.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 14 is a table for explaining definition of link states of L 0, L 0s, L 1, and L 2;

FIG. 15 is a timing chart for explaining control of an active state power management;

DETAILED DESCRIPTION OF THE PREFERRED EMBODIMENTS

Exemplary embodiments of the present invention are described in detail below with reference to the accompanying drawings. Prior to the description of the embodiments of the present invention, the PCI Express and Advanced Switching (AS) are explained.

Overview of the PCI Express Standard

In an embodiment of the present invention, the PCI Express (trademark), one of high-speed serial buses, is used. First, the overview of the PCI Express standard is described with reference to an article by Hisashi Satomi "Overview of PCI Express standard", taken from journal "Interface" July 2003, which is incorporated herein by reference. The high-speed serial bus is an interface capable of transmitting data at a high-speed (100 megabits per second or higher) using one serial transmission path.

The PCI Express is a standardized expansion bus developed as a successive version of the PCI bus, and can be commonly used in computers. The PCI Express is characterized by the low-voltage differential signal transmission, communication channels allowing independent point-to-point transmission and reception, packetized split-transaction, and high-scalability due to the differences in link structure.

Figure 1:
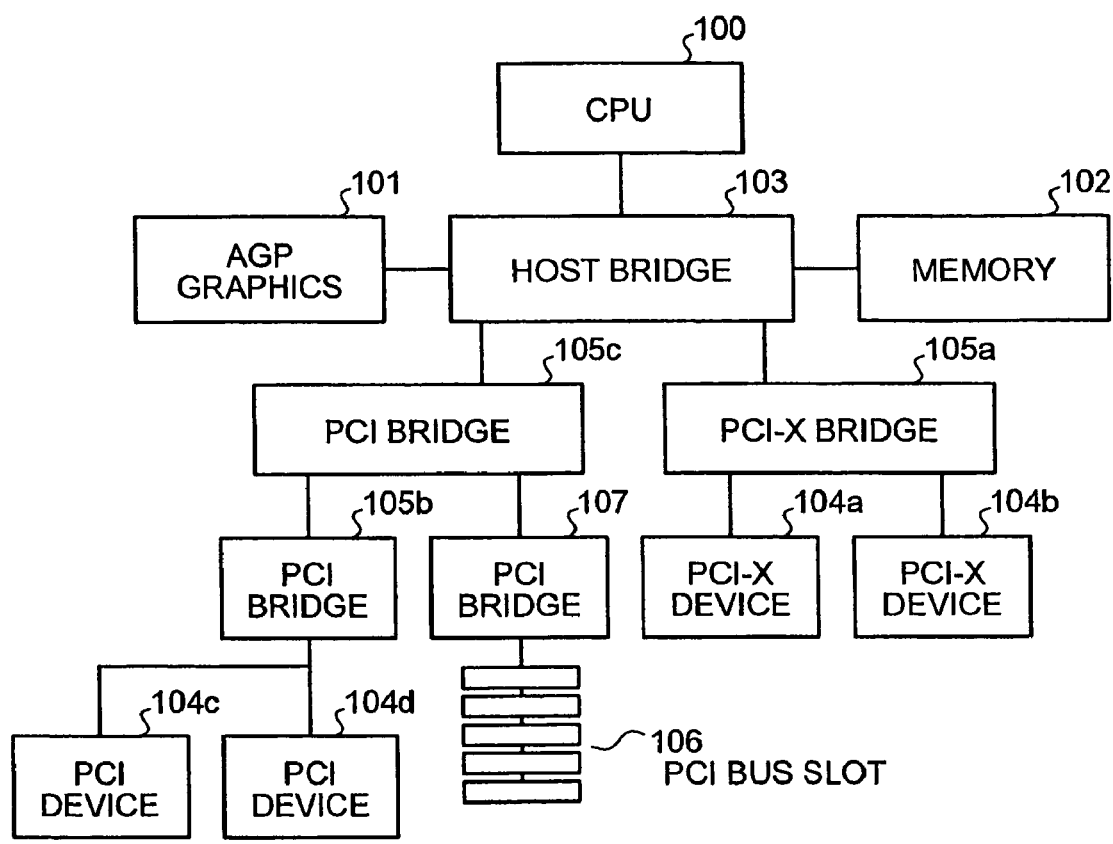
FIG. 1 is a block diagram of an example of a conventional PCI system.
Figure 2:
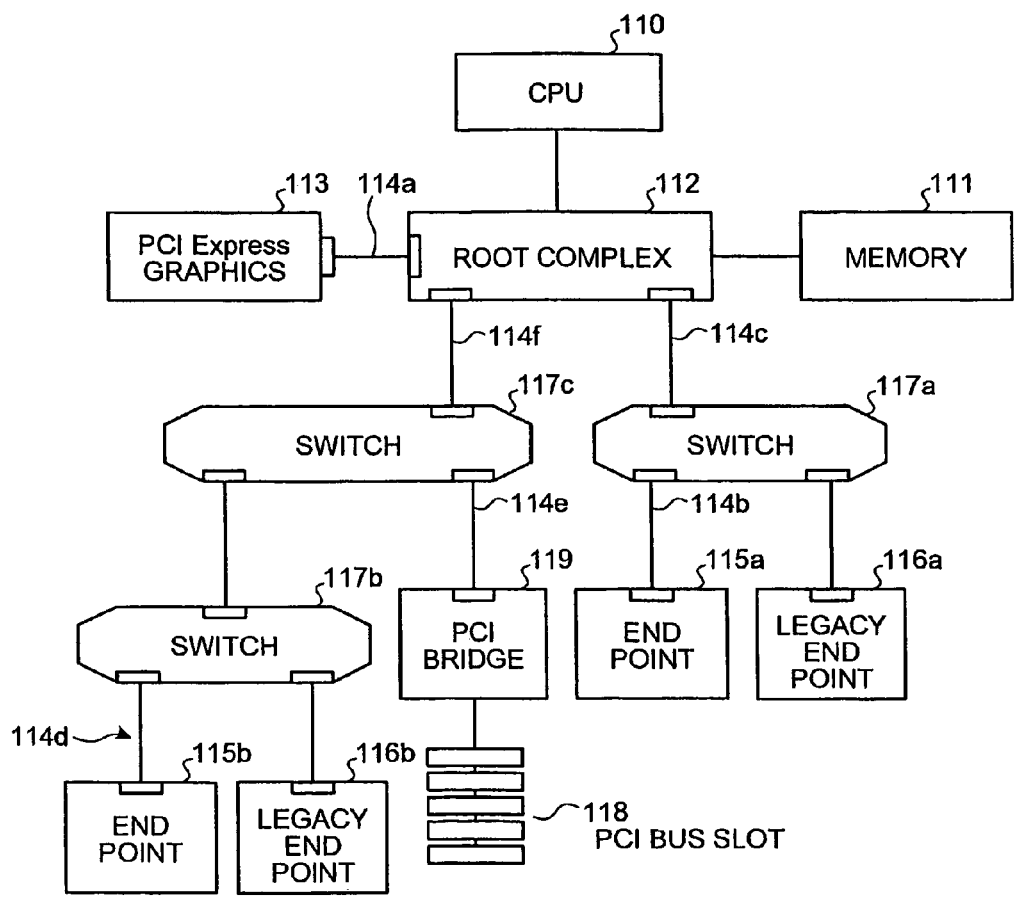
FIG. 2 is a block diagram of an example of a PCI Express system.

FIG. 1 depicts an example of a conventional PCI system, and FIG. 2 depicts an example of a PCI Express system. The PCI system has a tree structure, and includes a host bridge 103 connected to a Central Processing Unit (CPU) 100, an Accelerated Graphics Port (AGP) graphics 101, and a memory 102, PCI-X (upper compatible standard of PCI) devices 104a and 104b connected via a PCI-X bridge 105a to the host bridge 103, a PCI bridge 105b connected to PCI devices 104c and 104d, and a PCI bridge 107 connected to a PCI bus slot 106. The PCI bridges 105b and 107 are connected via a PCI bridge 105c to the host bridge 103.

In contrast, the PCI Express system has a tree structure, and includes a root complex 112 connected to a CPU 110 and a memory 111, a PCI Express graphics 113 connected to the root complex 112 through a PCI Express 114a, and a switch 117a connected via a PCI Express 114b to an end point 115a and a legacy end point 116a, a switch 117c connected via a PCI Express 114e to a PCI bridge 119 and a switch 117b, an end point 115b and a legacy end point 116b connected via a PCI Express 114d to the switch 117b, and a PCI bus slot 118 connected to the PCI bridge 119. The switches 117a and 117c are connected via PCI Expresses 114c and 114f, respectively, to the root complex 112.

Figure 3:
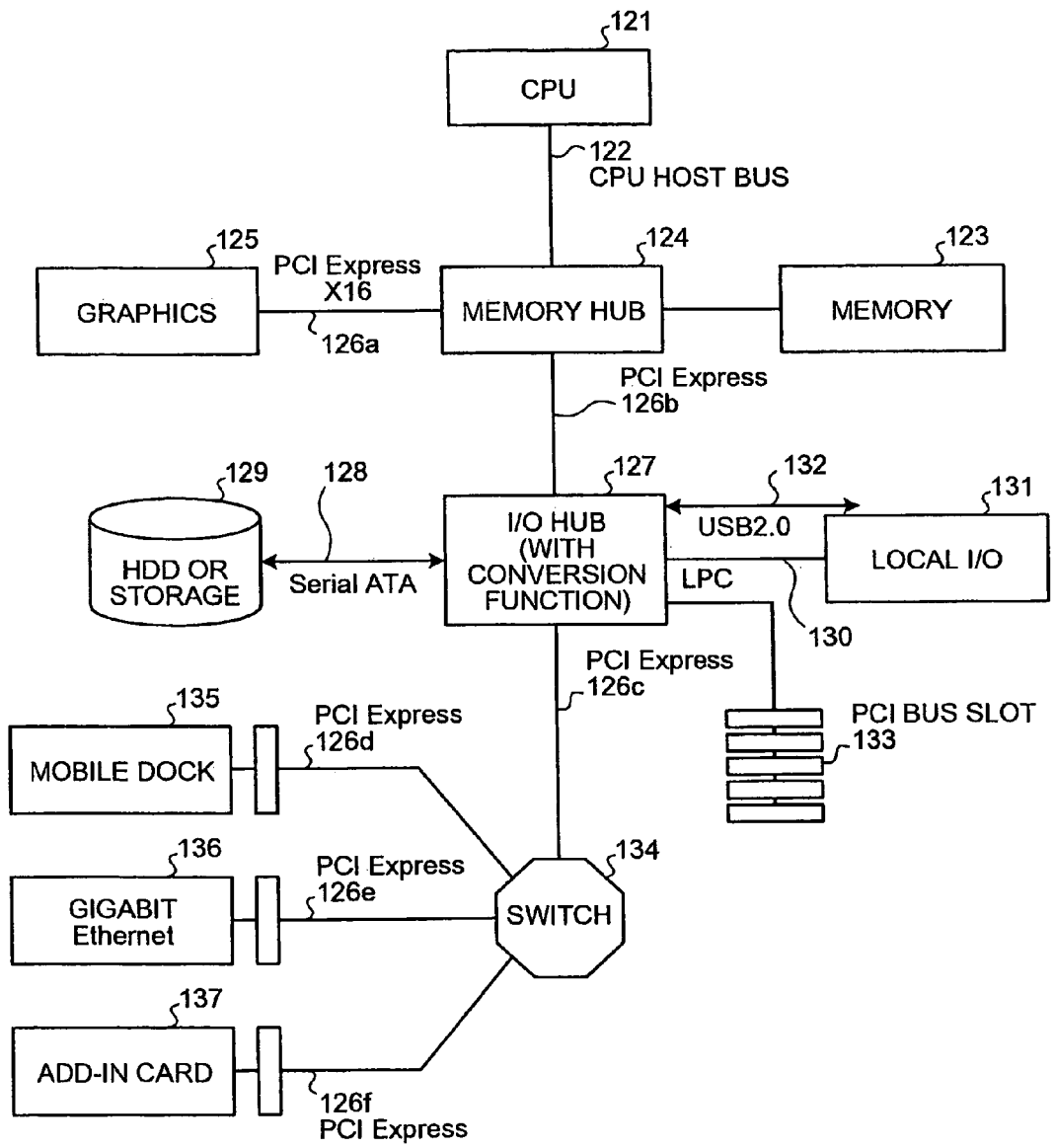
FIG. 3 is a block diagram of an example of a PCI Express platform for a desktop or a mobile computer.

FIG. 3 depicts an example of a PCI Express platform for practical use. In FIG. 3, the PCI Express is applied to a desktop or a mobile computer. A graphics 125 is connected via a PCI Express x16 126a to a memory hub 124 (corresponding to the root complex), which is connected via a CPU host bus 122 to a CPU 121 and also to a memory 123. An input/output (I/O) hub 127 with a conversion function is also connected to the memory hub 124 via a PCI Express 126b. The I/O hub 127 is connected to a storage (or a HDD) 129 via a serial AT Attachment (ATA) 128, a local I/O 131 via a LPC 130, a USB 2.0 132, and a PCI bus slot 133. A switch 134 is connected to the I/O hub 127 via a PCI Express 126c. A mobile dock 135, a gigabit Ethernet 136 and an add-in card 137 are connected to the switch 134 via a PCI Express 126d, 126e and 126f, respectively.

Namely, in the PCI Express system, the existing buses such as PCI, PCI-X, and AGP are replaced with the PCI Express, and bridges are used for connection of the existing PCI/PCI-X devices. The PCI Express connection is also used between chipsets. The existing buses such as IEEE1394, Serial ATA, and USB 2.0 are connected to the PCI Express via the I/O hub.

Components of PCI Express

A. Port, Lane, and Link

Figure 4:
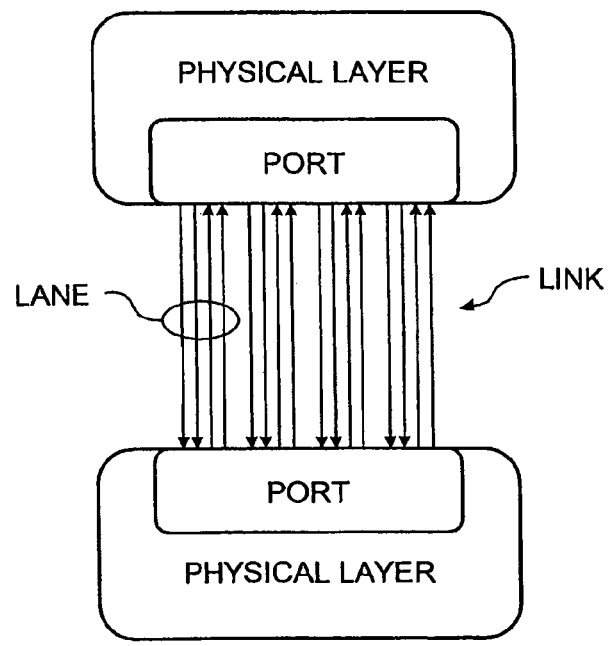
FIG. 4 is a schematic of an example of a physical layer structure with x4 links.
Figure 5:
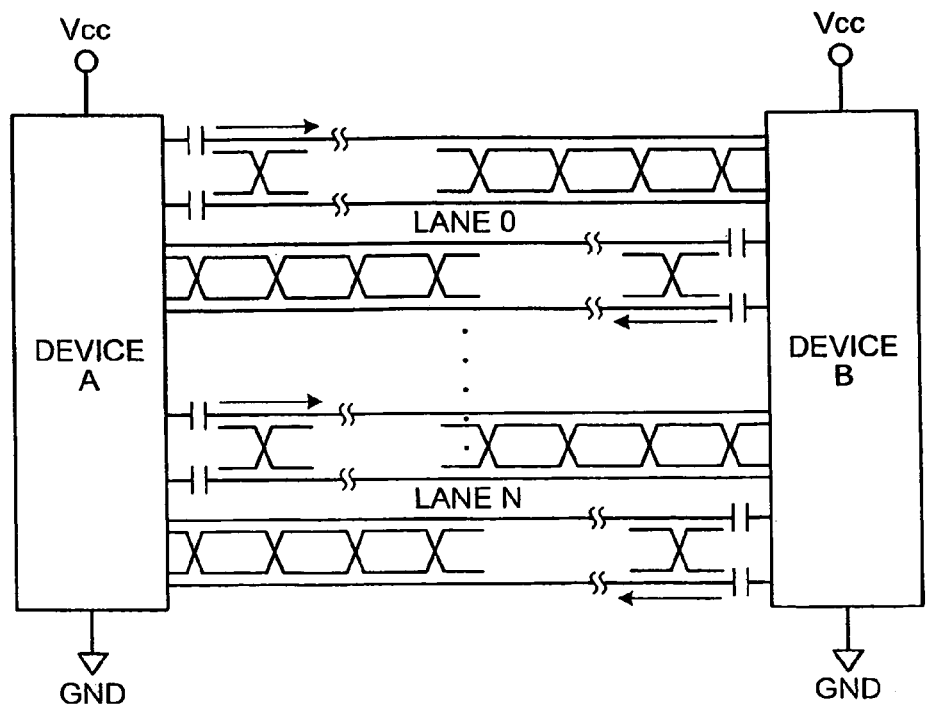
FIG. 5 is a schematic for explaining an example of lane connection between devices.

FIG. 4 depicts a physical layer structure. Ports are a collection of transmitters and receivers physically present in the same semiconductor that forms a link, and logically represents an interface for point-to-point connection between a component and a link. The data transfer rate is, for example, 2.5 gigabits per second for one way. A lane consists of, for example, two pairs of differential signals at 0.8 volts, including one pair of signals (two paths) for transmitting and the other pair of signals (two paths) for receiving. A link consists of two ports and a collection of lanes linking the ports. Namely, the PCI Express is a dual simplex bus. The xN link consists of N lanes, and in the current standard, there are variations of N=1, 2, 4, 8, 16, and 32. FIG. 4 depicts a PCI Express x4. As shown in FIG. 5, with the variable lane width N between devices A and B, the PCI Express architecture offers scalable bandwidth.

B. Root Complex

The root complex 112 is on the top of the I/O architecture, and connects the CPU or the memory subsystem to the I/O. The root complex is usually represented as a memory hub as in FIG. 3. The root complex 112 (or the memory hub 124) has one or more PCI Express ports or root ports (indicated by rectangles in the root complex 112 in FIG. 2), and each port forms an independent I/O layer domain. The I/O layer domain can be a simple end point (for example, the end point 115*a* in FIG. 2) or can be a collection of switches and end points (the end point 115*b*, the switch 117*b*, etc.).

C. End Point

The end points 115 are devices (other than a bridge) with a type 00h configuration space header. Types of the end points include a legacy end point and a PCI Express end point. The PCI Express end point differs from the legacy end point mainly in that the PCI Express end point is a base address register (BAR) not requiring I/O resources, and therefore does not make an I/O request. The PCI Express end point does not support a lock request.

D. Switch

Figure 6:
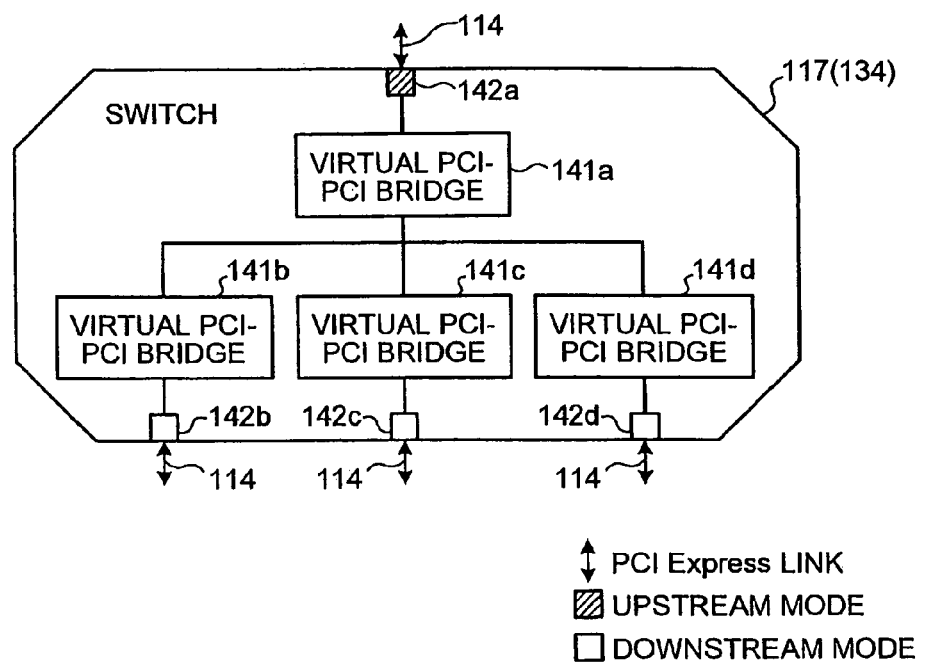
FIG. 6 is a block diagram of an example of a logical configuration of a switch.

The switch 117 (or the switch 134) connects two or more ports, and performs packet routing between the ports. As shown in FIG. 6, the switch is recognized as a collection of virtual PCI-PCI bridges 141 by configuration software. Up-and-down arrows in FIG. 6 represent the PCI Express link 114 (or the PCI Express 126), and reference numerals 142*a* to 142*d* represent ports. The port 142*a* is an upstream port close to the root complex, and the ports 142*b*, 142*c*, and 142*d* are downstream ports distant from the root complex.

E. PCI Express 114*e*-PCI Bridge 119

A PCI bridge 119 provides connection from the PCI Express to the PCI/PCI-X. With this bridge, the existing PCI/PCI-X device can be used in the PCI Express system.

Layer Architecture

Figure 7A:
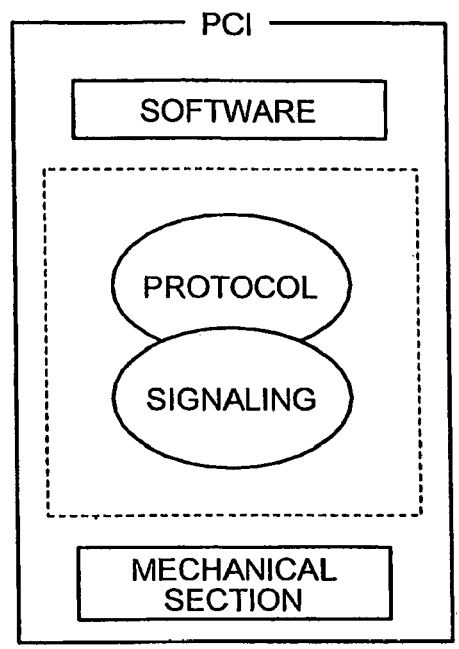
FIG. 7A is a block diagram of existing PCI architecture.
Figure 7B:
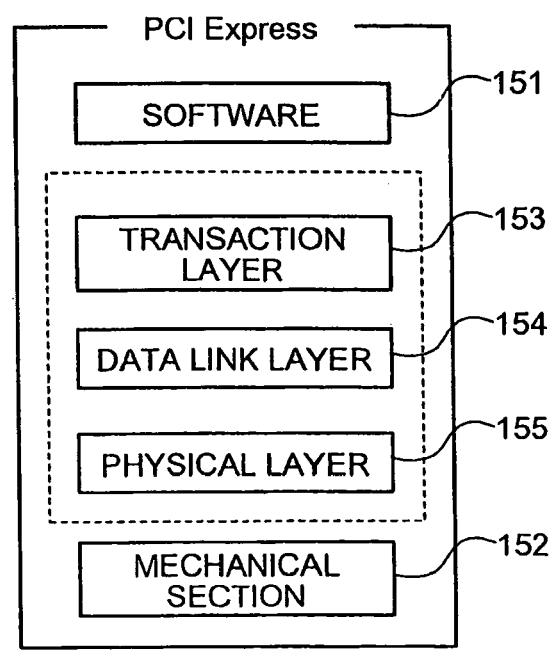
FIG. 7B is a block diagram of PCI Express architecture.

As shown in FIG. 7A, in the conventional PCI architecture, protocol and signaling are closely related to each other, and there is no concept of layering. As can be seen from FIG. 7B, the PCI Express has a hierarchical structure as with the common communication protocol or InfiniBand, with each layer being independent and having unique specifications. Between software 151 in the top layer and a mechanical section 152 in the bottom layer, there are three layers: a transaction layer 153, a data link layer 154, and a physical layer 155, in this order from top to bottom. Because of the structure described above, the PCI Express ensures modularity of each layer, which realizes the high scalability and reuse of the modules. For example, when a new signal coding or transmission medium is employed for the PCI Express system, it is only required to replace the physical layer, i.e., the data link layer and the transaction layer can be left unchanged.

The transaction layer 153, the data link layer 154, and the physical layer 155 are the main layers in the PCI Express architecture. Functions of the three layers are described below with reference to FIG. 8.

A. Transaction Layer 153

Figure 9:
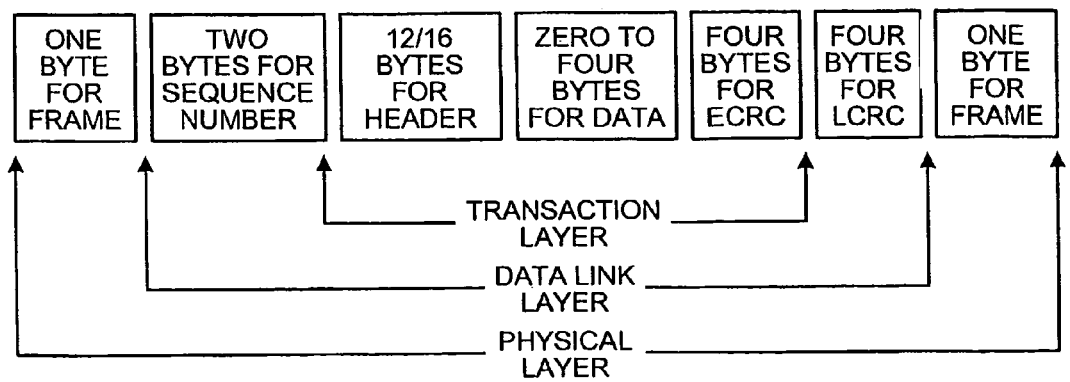
FIG. 9 is a schematic for explaining a format example of transaction layer packet.

The transaction layer 153 is an upper layer of the PCI-Express architecture, and has the functions of transaction layer packet (TLP) assembly and disassembly. The TLP is used to carry transactions such as read/write and various events. The transaction layer 153 performs a flow control with a credit for TLP. FIG. 9 illustrates an outline of the TLP in each of the layers 153 to 155. The details are described later.

B. Data Link Layer 154

Main functions of the data link layer 154 are to ensure data integrity in the TLP by detecting and correcting (retransmitting) errors, and link management. Packets are transmitted among the data link layer 154 for link management and flow control. The packet transmitted among the data link layer 154 is called data link layer packet (DLLP) so as to discriminate the packet from the TLP.

C. Physical Layer 155

The physical layer 155 includes circuits necessary for interface operation such as a driver, an input buffer, a parallel to serial/serial to parallel converter, a phase-locked loop (PLL), and an impedance matching circuit. The physical layer initializes and maintains interfaces as a logical function. The physical layer 155 also makes the data link layer 154 and the transaction layer 153 independent from the signaling technique used in the actual links.

The PCI Express employs an embedded clock for hardware configuration. In the embedded clock technique, a clock signal is not used, and a clock timing is embedded in a data signal so that a receiver extracts a clock based on a cross point of the data signal.

Configuration Space

Figure 10:
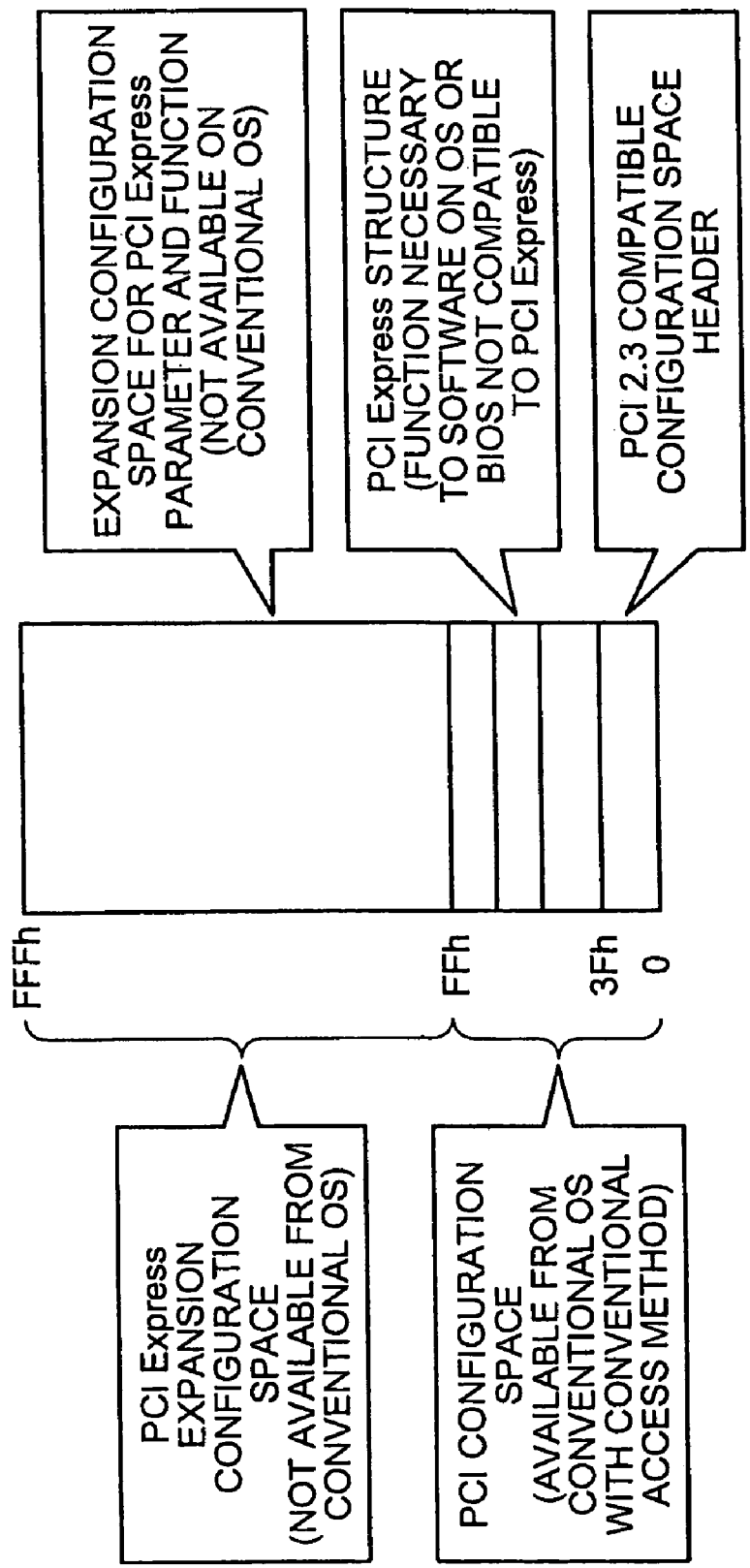
FIG. 10 is a schematic for explaining PCI Express configuration space.

The PCI Express has a configuration space as in the conventional PCI. The configuration space of the conventional PCI is 256 bytes, while that of the PCI Express is expanded to 4096 bytes as shown in FIG. 10. Accordingly, the PCI Express assures a sufficient space for devices requiring a large number of unique register sets such as a host bridge. Access to the configuration space is performed as access to a flat memory space (configuration read/write), and a bus, a device, a function, and a register number are mapped on the memory address.

A header, 256 bytes, of the configuration space can be accessed as a PCI configuration space from a basic input/output system (BIOS) or a conventional operating system (OS) via an I/O port. A function for converting conventional access to PCI Express access is implemented on the host bridge. From type 00h to 3Fh, a configuration space header is compatible with the PCI 2.3. Because of the feature, the conventional OS or software can be used without modifications except for functions extended with the PCI Express. Namely, the software layer of the PCI Express succeeds the load/store architecture (an architecture in which a processor directly accesses an I/O register) that maintains compatibility with the existing PCI. To use the functions extended with the PCI Express (for example, synchronized transmission and Reliability, Availability and Serviceability (RAS) functions), it is required to access PCI Express space extended by 4 kilobytes.

There are various form factors for the PCI Express, such as an add-in card, a plug-in card, and Mini PCI Express.

Details of PCI Express Architecture

The transaction layer 153, the data link layer 154, and the physical layer 155, which are the main part of the PCI Express architecture, are described in detail below.

A. Transaction Layer 153

As described above, the main function of the transaction layer 153 is to assemble and disassemble the TLP between the software 151 in the upper layer of and the data link layer 154 in the lower layer of.

a. Address Space and Transaction Type

Four address spaces are defined in the PCI Express. Specifically, in addition to three spaces having been supported in the conventional PCI: a memory space (a space for data transmission between memory spaces), an I/O space (a space for data transmission between I/O spaces), and a configuration space (a space for device configurations and setups), a message space (a space for in-band notification of events or general message transmission (exchange) between PCI Express devices. A request for interruption or confirmation is delivered by using the message as a virtual wire). A specific transaction type is defined for each space. That is, each of the memory space, the I/O space, and the configuration space is read/write, and the message space is basic (including vendor definitions).

b. Transaction Layer Packet (TLP)

The PCI Express performs communications packet by packet. In the TLP format shown in FIG. 9, a header is 3 double words long (12 bytes in total) or 4 double words (16 bytes), containing information such as a format of the TLP (the header length and presence of a payload), a transaction type, a traffic class (TC), an attribute, and a payload length. The maximum length of the payload in a packet is 1024 double words (4096 bytes).

The End-to-end Cyclic Redundancy Check (ECRC) is a cyclic redundancy check (CRC) of 32 bits, a part of the TLP, and ensures end-to-end data integrity. The ECRC is calculated because, when an error occurs in the TLP, for example, within a switch, the Link-CRC (LCRC) cannot detect such error (the LCRC is recalculated based on the error TLP).

A complete packet is required in some requests, but is not required in other requests.

c. Traffic Class (TC) and Virtual Channel (VC)

Upper software can differentially treat traffics (set priority of traffics) by setting a traffic class (TC). With this function, for example, the software transfers image data before network data. There are eight classes from TC 0 to TC 7 in the TC.

Figure 11:
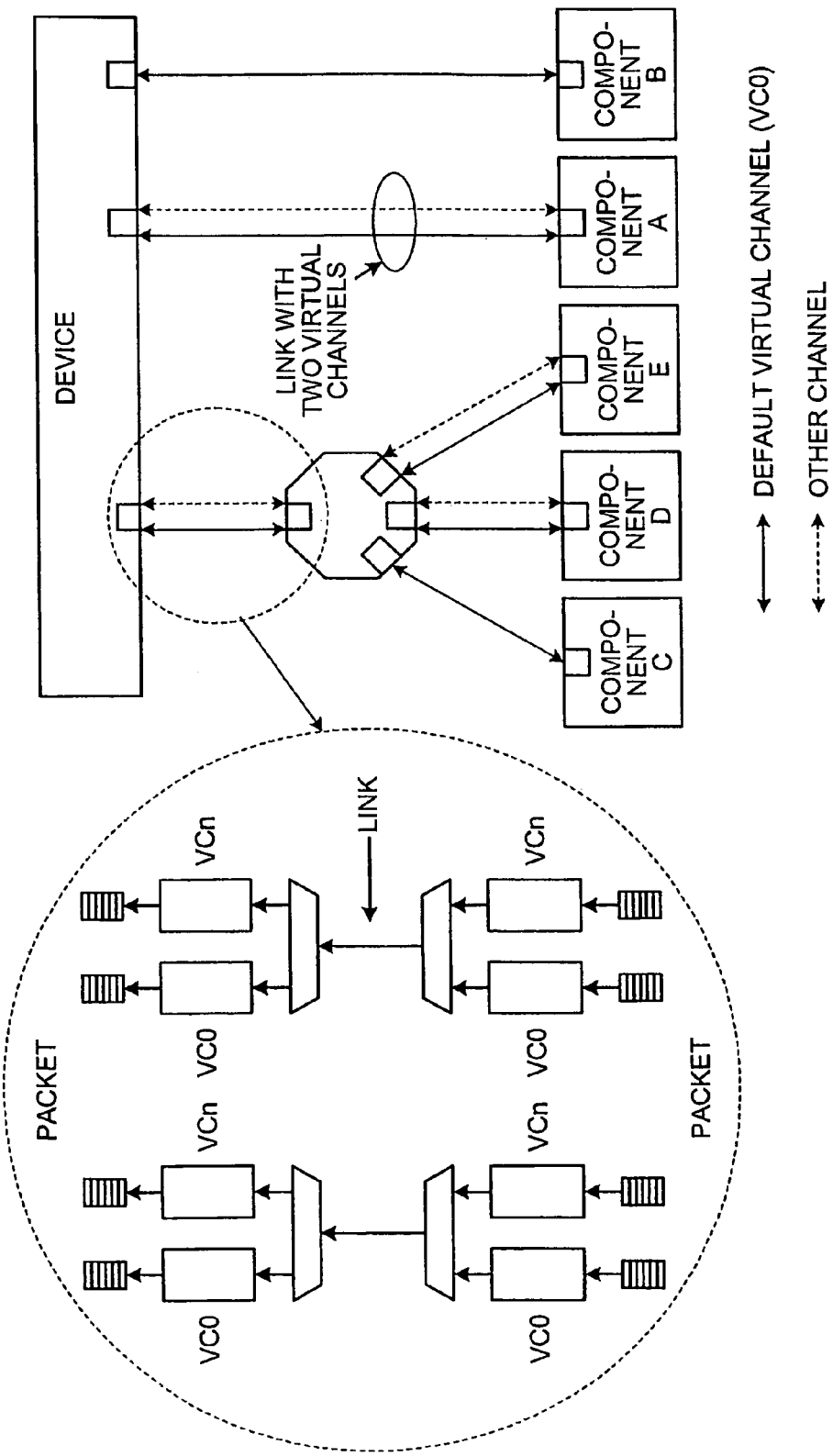
FIG. 11 is a schematic for explaining a concept of a virtual channel.

A virtual channel (VC) is an independent virtual-communication bus (employing a mechanism using a plurality of independent data-flow buffers that share the same link). Each VC has resources (such as a buffer and a queue), and independently performs a flow control as shown in FIG. 11. With the mechanism, even when a buffer of a VC is full, data can be transferred over another VC. That is, one link, a physical sense, is divided into a plurality of VCs, and can be used effectively. For example, as can be seen from FIG. 11, when a path branches via a switch to link to a plurality of devices, the PCI Express can control priority of traffics to each device. A VC 0 is an essential one and the other VCs (VC 1 to VC 7) are implemented based on cost-performance tradeoff. Solid arrows indicate default VCs (VC 0), and dotted arrows indicates the other VCs (VC 1 to VC 7).

In the transaction layer, a TC is mapped on a VC. When the number of VCs is small, one or more TCs can be mapped on one VC. In a simple example, one TC can be mapped on one VC in one-to-one fashion, or all TCs can be mapped on one VC 0. Mapping of TC 0 on VC 0 is essential and fundamental, while mapping of other TCs is controlled by the upper software. The software can control priority of transactions by using the TC.

d. Flow Control

Flow control is necessary to avoid overflow in a receive buffer and to establish a transmission order. The flow control is performed between links not in an end-to-end manner, but in a point-to-point manner. Therefore, the arrival of a packet at destination (completer) cannot be confirmed by the flow control.

Flow control in the PCI Express is performed on credit basis (before initiation of data transfer, the available space of a receiver's buffer is checked to avoid overflow or underflow). Specifically, the receiver notifies the sender of a buffer capacity (credit value) when a link is initialized. The sender compares the length of a packet to be sent with the credit value. Only when remaining space in the buffer is sufficient for the packet, the sender sends the packet to the receiver. There are six types of the credit.

Information for the flow control is exchanged by the DLLP in the data link layer. The flow control is applied only to the TLP and not to the DLLP (the DLLP can be transmitted and received all the time).

B. Data Link Layer 154

As described above, a main role of the data link layer is to provide a highly reliable function of exchanging TLPs between two components on a link.

a. Handling of Transaction Layer Packet (TLP)

Having received a TLP from the transaction layer 153, the data link layer 154 attaches a 2-byte sequence number to the head of the TLP and a 4-byte LCRC to the tail, and sends the TLP to the physical layer 155 (refer to FIG. 9). The TLP is stored in a retry buffer and is retransmitted until an acknowledgement (ACK) is received. When a transmission failure of the TLP continues, the data-link layer determines that the link is defective, and requires the physical layer 155 to retrain the link. When the retraining of the link fails, the data link layer 154 becomes inactive.

The TLP received from the physical layer 155 is checked for the sequence number and the LCRC. When the TLP is valid and error-free, the TLP is sent to the transaction layer 153. When the TLP has an error, the data link layer 154 requests the physical layer 155 for retransmission.

b. Data Link Layer Packet (DLLP)

Figure 12:
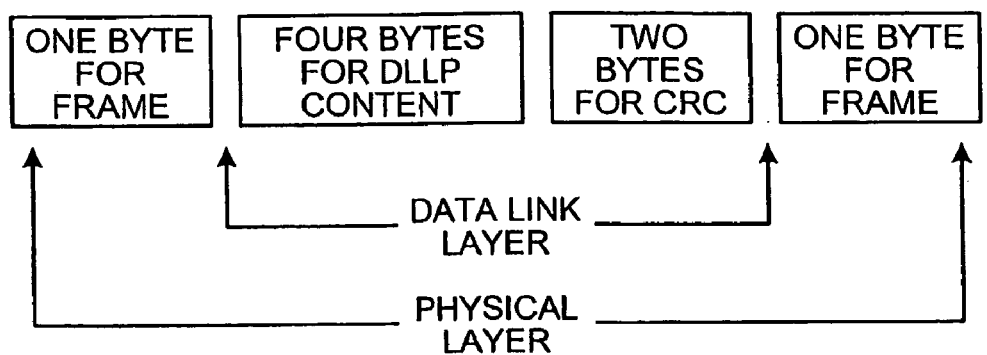
FIG. 12 is a schematic for explaining a format example of data link layer packet.

TLP is automatically split into DLLPs as shown in FIG. 12 to be sent to each lane from the physical layer 155. A packet generated in the data link layer 154 is called data link layer packet (DLLP) and is exchanged in the data link layer 154. There are three types of DLLP as follows:

ACK/Nak: acknowledgement of TLP, retry

InitFC1/InitFC2/UpdateFC: initializing and updating of flow control

DLLP for power management

As shown in FIG. 12, the DLLP is 6-byte long, and is composed of a DLLP type (one byte), information unique to the DLLP type (three bytes), and CRC (two bytes).

C. Physical Layer-Logical Sub-Block 156

Figure 8:
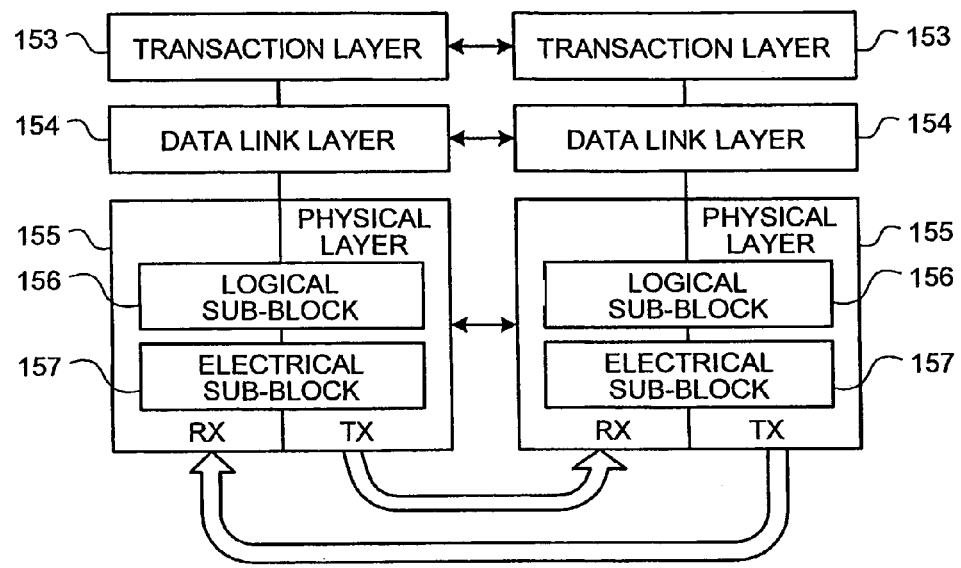
FIG. 8 is a block diagram of a hierarchical structure of PCI Express.

A main function of a logical sub-block 156 in the physical layer 155 shown in FIG. 8 is to convert a packet received from the data link layer 154 into a specific format so that an electrical sub-block 157 can transmit the packet. The logical sub-block 156 also controls and manages the physical layer 155.

a. Data Coding and Parallel-to-Serial Conversion

Figure 13:
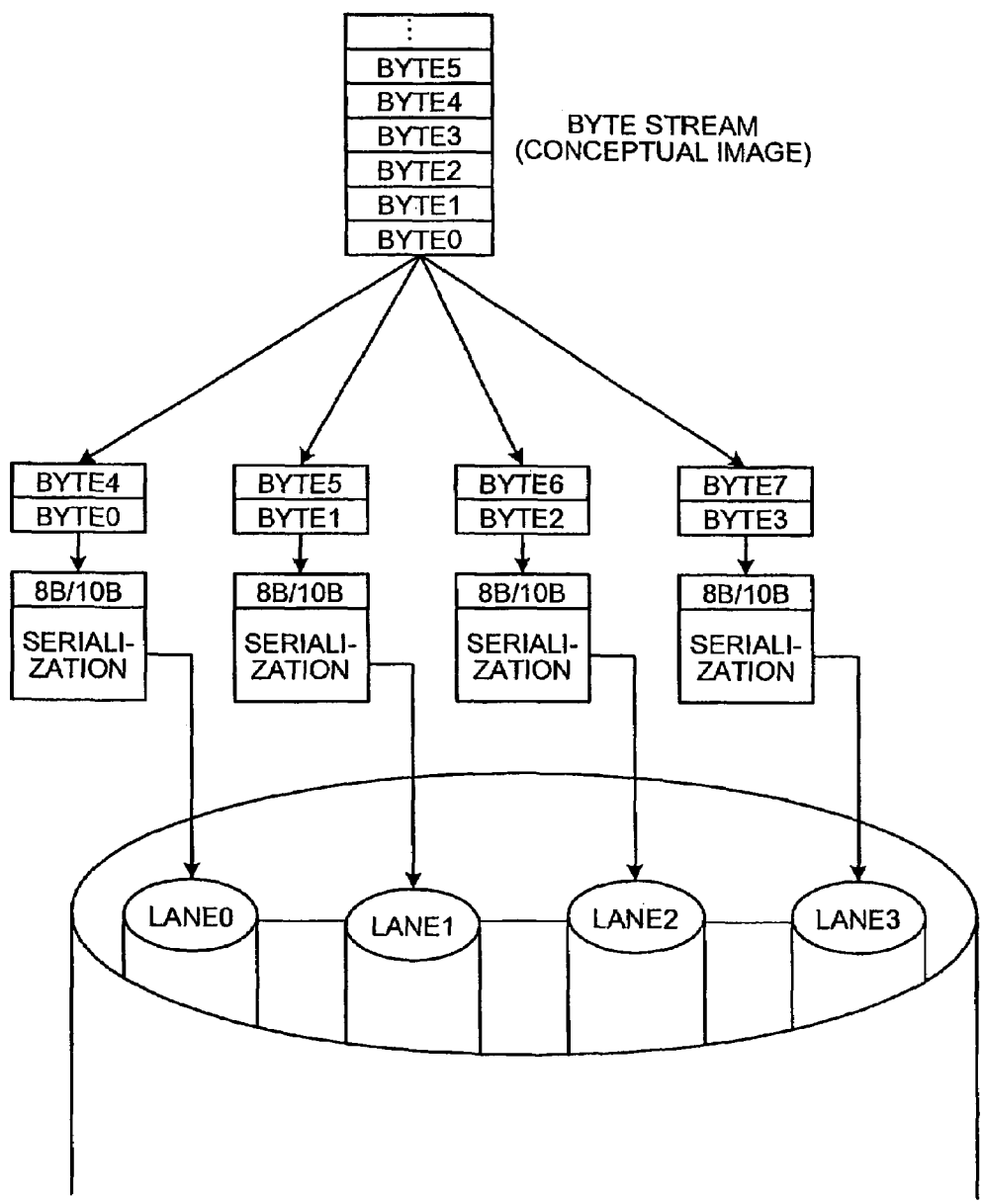
FIG. 13 is a schematic for explaining byte stripping in a x4 link.

The PCI Express employs 8B/10B conversion in data coding to avoid a series of 0s or 1s (i.e., to make a cross-point occur within a prespecified period). As shown in FIG. 13, coded data is converted into serial data, and is sent from the logical sub-block on the lane. When there is a plurality of lanes (FIG. 13 depicts the PCI Express x4 links), the data is allocated on each lane in unit of byte before coding. PCI Express replaces a parallel bus with a series of serial buses. That is, because the data is transferred independently in each lane, the problem of skew in parallel buses can be effectively reduced.

b. Power Management and Link States

To suppress power consumption of a link, four link states: L 0, L 0s, L 1, and L, are defined as shown in FIG. 14.

L 0 represents a normal mode, and the power consumption becomes less from L 0s to L 2, but a longer time is required to return to L 0. As can be seen from FIG. 15, in addition to power management by software, active state power management enables further power reduction.

D. Physical Layer-Electrical Sub-Block 157

The main function of the electrical sub-block 157 in the physical layer is to send data serialized by the logical sub-block 156 on a lane, and to receive data from a lane to send the data to the logical sub-block 156.

a. Alternating Current (AC) Coupling

A sender in a link is installed with an alternating current (AC) coupling capacitor so that a direct current (DC) common mode voltage at the sender can be different from that at a receiver. Because of the feature, the sender can employ a design, a semi-conductor process, and a power supply voltage different from those at the receiver.

b. De-Emphasis

As described above, the PCI Express uses 8B/10B encoding to avoid a series of 0s and 1s as possible. However, 8B/10B encoding may allow up to five successive 0s or 1s. In this case, the sender is required to transfer de-emphasized data. De-emphasis means lowering a differential voltage level (voltage amplitude) from the second bit by 3.5±0.5 decibels to ensure a signal noise margin for the receiver when data contains consecutive bits with the same polarity. Due to attenuation dependent on a frequency of a transmission path, when bits of a signal change, the signal contains many high-frequency components, and a waveform thereof is small on the receiver side. On the other hand, when bits do not change, the signal contains few high-frequency components, and the waveform is relatively large on the receiver side. De-emphasis is performed to maintain the waveform constant on the receiver side.

What is the Advanced Switching?

According to the embodiments of the present invention, Advanced Switching (AS) based on the PCI Express architecture described above is utilized. An overview of the AS is described below.

With the rapid integration of computing and communications led by progress in the broadband and semi-conductor techniques, a new standard to cover new application systems has been desired. Against such a background, the AS standard has been developed, which is expected to cover a wide range of applications from computing to communications. Advanced Switching Interconnect Special Interest Group (AIS-SIG), a non-profit organizations, popularized the AS specification.

Overview of the Techniques

Figure 16:
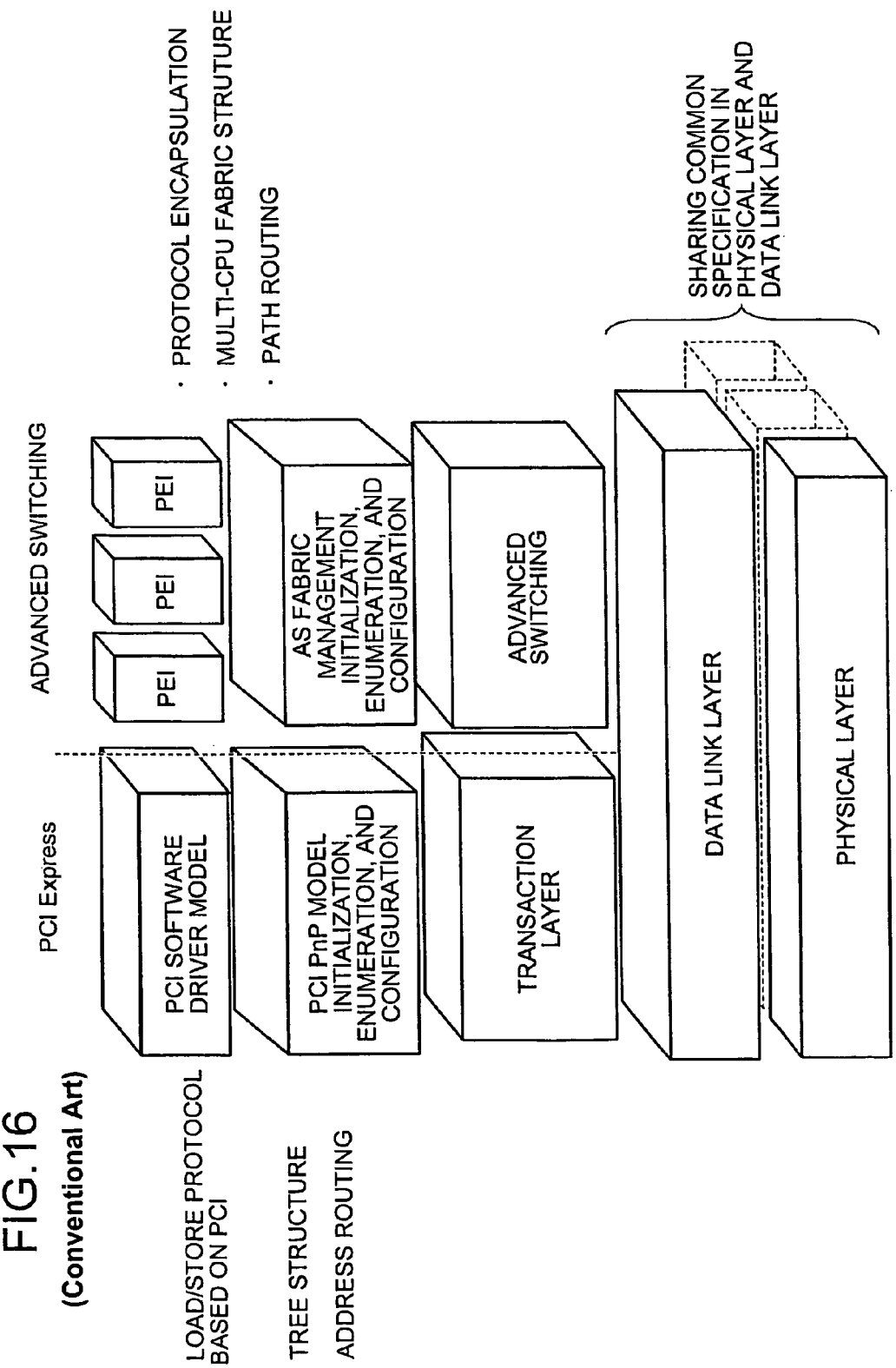
FIG. 16 is a schematic for explaining a relation between the PCI Express architecture and an Advanced Switching (AS) system.

A relation between the PCI Express and the AS is described below. FIG. 16 depicts a relation between the PCI Express protocol stack and the AS protocol stack. The AS is applicable to a wider range of applications, including chip-to-chip and board-to-board interconnect applications, while using the same physical-link and data-link layers as the PCI Express architecture for the high-speed serial transmission. Although the transaction layer of the PCI Express is identical to the PCI transaction layer, which has been used for computing, the AS replaces the transaction layer of the PCI Express with a new one to cope with higher data flows and protocols. In addition, as for the topology, the AS allows a fabric structure having a high degree of freedom than the tree structure employed by the PCI Express, and can be used under the multi-CPU environment. A routing mechanism of the AS is substantially improved compared to that of other standards that allow the fabric structure such as Ethernet (trademark) or InfiniBand. It means that the AS architecture improves operation speed.

Figure 17:
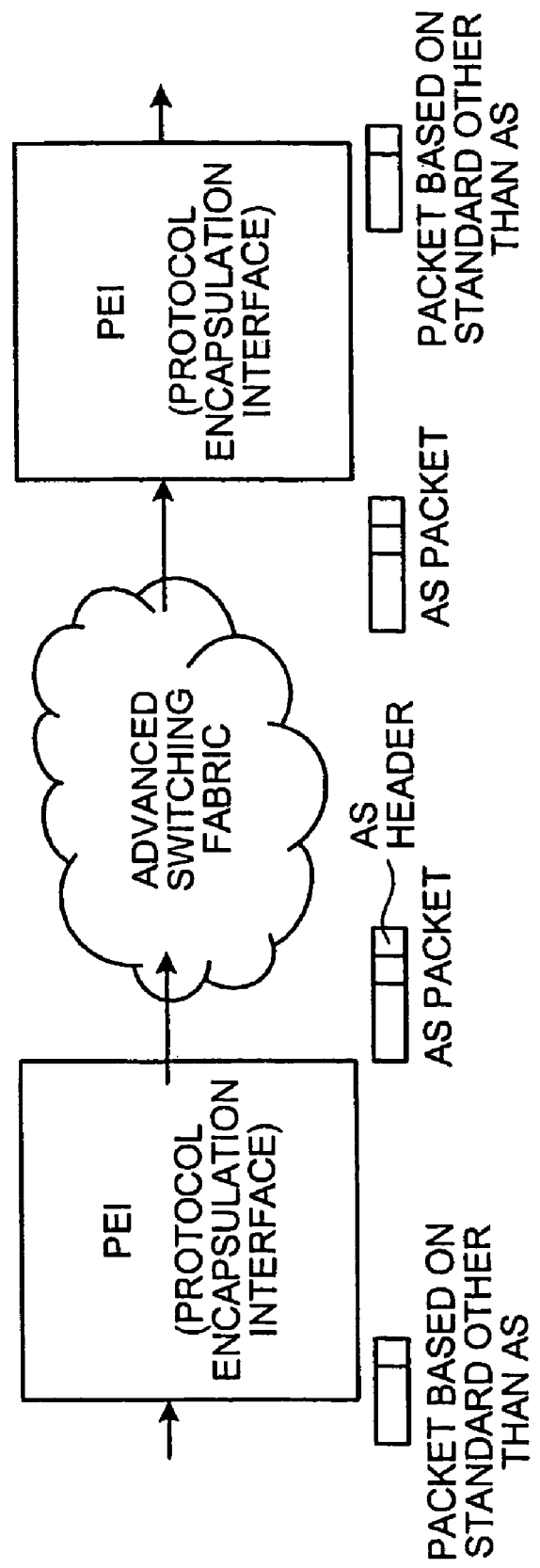
FIG. 17 is a schematic for explaining encapsulation of protocol in the AS system shown in FIG. 16.

As can be seen from FIG. 17, by encapsulating various types of protocols, the AS technology provides services based on a higher protocol (for example, Transmission Control Protocol/Internet Protocol (TCP/IP) or Fiber Channel) at a high speed. The AS architecture includes a Protocol Encapsulation Interface (PEI) in the upper layer, in which an AS header is attached to a packet from the outside to convert the packet into an AS packet. The converted AS packet traverses through the AS fabric, and reaches a receiver's PEI in which the AS header is removed to be the original packet. A protocol interface located upstream and called PI complies with various standards, and implements such protocols as the AS Native or the Vendor Specific. A profile for connecting the PCI Express to an AS bridge and encapsulating a PCI Express protocol for transmission is defined as a Protocol Interface 8 (PI-8).

Features of the Advanced Switching Technology

The AS has unique features, in addition to the features of the PCI Express such as high-speed transmission, bandwidth scalability, extensibility of the physical layer due to the hierarchical structure, and data reliability, as follows:

Supporting transmission of an unreliable (lossy) packet of a moving image, etc.

Supporting a multicast packet and a broadcast packet

Encapsulation for multi-protocol transmission

Unique and high-speed path-routing system

Supporting convergence control

Supporting the fabric structure

Figure 18:
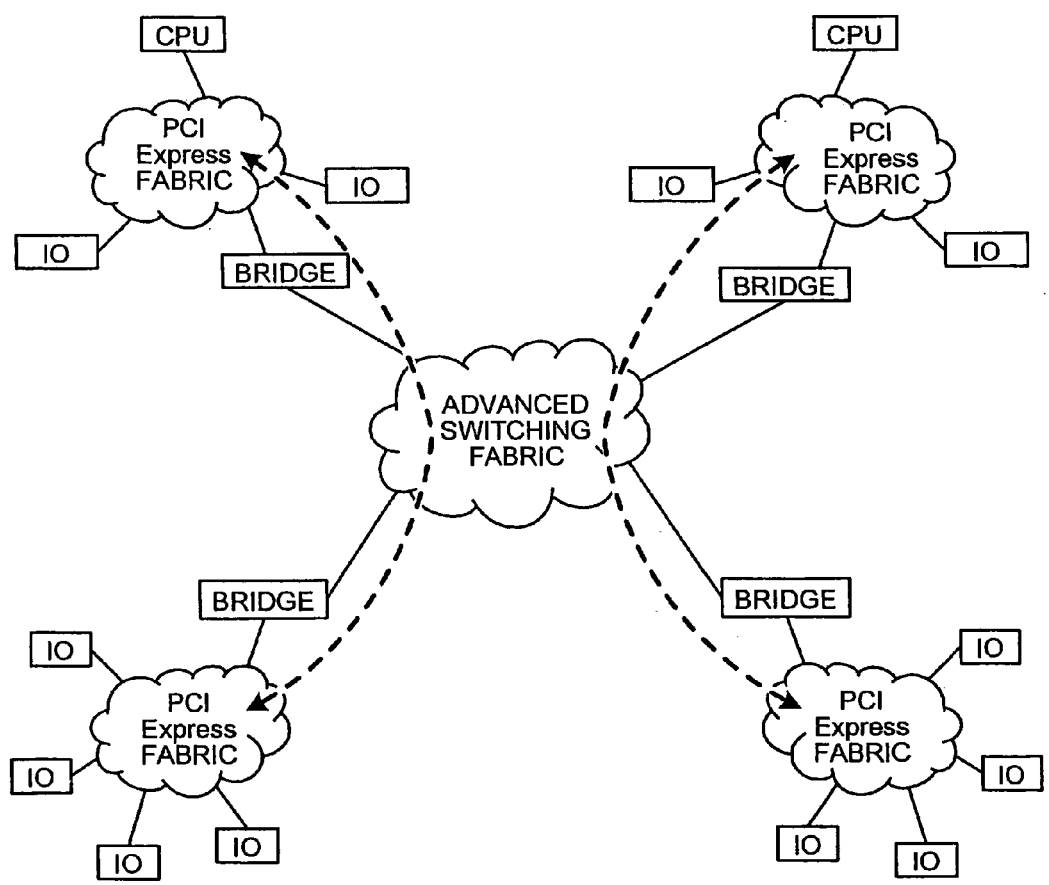
FIG. 18 is a schematic for explaining a storage/Input-Output (IO) resource sharing system between two or more devices.
Figure 19:
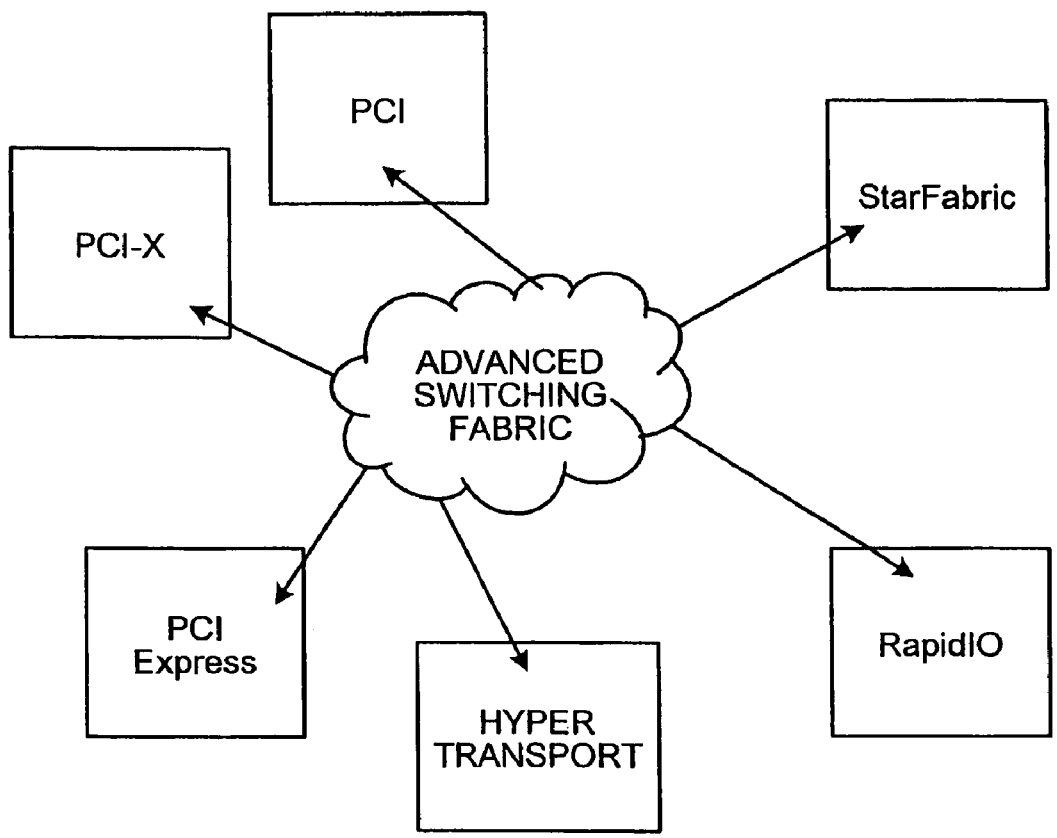
FIG. 19 is a schematic for explaining an example of Advanced Switching communications.

Those AS features allow shared use of a storage or IO resources by a plurality of devices as shown in FIG. 18. Standards such as the PCI, the PCI-X, the PCI Express, the Hyper Transport, the RapidIO, and the StarFabric require a complicated connection, even though the standards employs the same load/store protocol, because the physical layers are different from each other. The AS technology realizes mutual communication as shown in FIG. 19 in a simple manner, and ensures a high-speed transmission. In addition, the AS technology makes it possible to build up a local system in which, for example, TCP/IP communication is performed at a speed higher than in the Ethernet by tunneling various types of upper protocols. Besides, the AS technology allows the system to be redundant through a fabric structure, thereby improving the robustness of the system, and enabling dynamic switching of routing paths.

Configuration of the Information Processor

Figure 20:
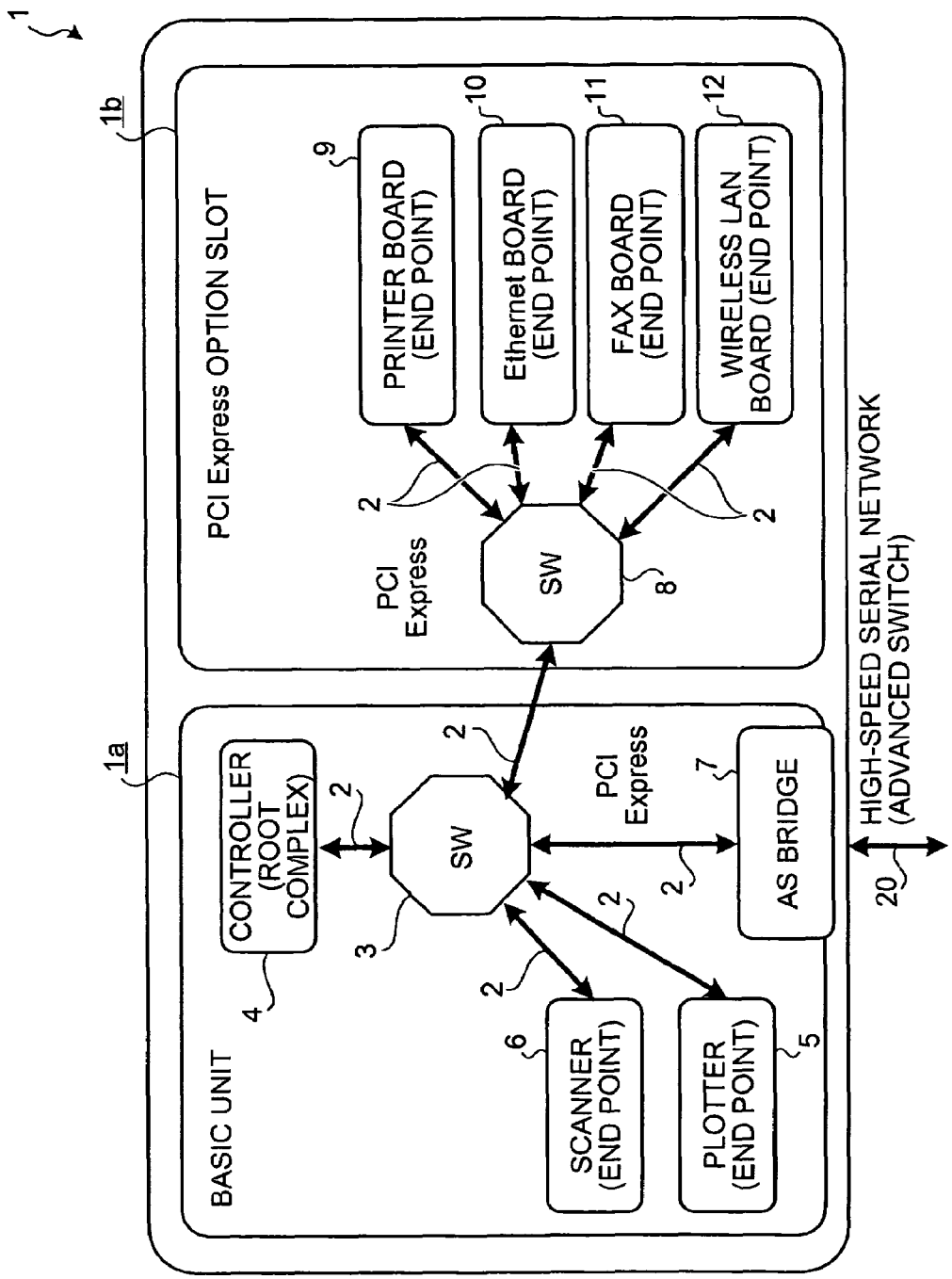
FIG. 20 is a schematic block diagram of an example of an information processor according to a first embodiment of the present invention.

FIG. 20 is a block diagram of an information processor 1 according to a first embodiment of the present invention. The information processor 1 is applied to a device such as MFP. The information processor 1 includes PCI Express buses 2, a switch 3, a controller 4 as a root complex, a plotter 5, and a scanner 6. The PCI Express buses 2 are high-speed serial buses serve as internal data buses. The controller 4 is connected via the switch 3 to the plotter 5 and the scanner 6, both being end points.

The controller 4 includes a CPU for controlling the entire system according to programs (software) installed in the information processor 1, and functions as a printer controller for performing such process as path control and path determination.

The plotter 5 prints or outputs image data on print paper, etc., and includes an electrophotographic plotter (printer) engine. Examples of printing methods available for the plotter 5 include, in addition to electrophotographic printing, inkjet printing, dye sublimation thermal-transfer printing, silver halide photography, direct thermal recording, and fusion thermal-transfer printing.

The scanner 6 reads image data based on an original image into the system, and includes a scanner engine for optically reading an original image to obtain image data.

The information processor 1 further includes an AS bridge circuit 7 that is connected to the controller 4 via the switch 3. The AS bridge circuit 7 converts between a PCI Express protocol packet (hereinafter, "PCI Express packet") inside the information processor 1 and an AS protocol packet (hereinafter, "AS packet") when inputting and outputting packets.

The controller 4, the plotter 5, the scanner 6, and the AS bridge circuit 7 serve as a basic unit 1a of the information processor 1.

The information processor 1 also includes a PCI Express option slot 1b that is connected to the basic unit 1a via a switch 8. The PCI Express option slot 1b includes optional devices for information processing, such as a printer board 13 as an optional board dedicated to processing image data written in a page description language (PDL) for printer (printer language), an Ethernet board 10 as a network board for Ethernet or giga Ethernet, a Facsimile (FAX) board 11 for FAX transactions, and a wireless Local Area Network (LAN) board 12. In FIG. 20, all of the optional boards 10 to 13 are installed on one information processor 1.

Figure 21:
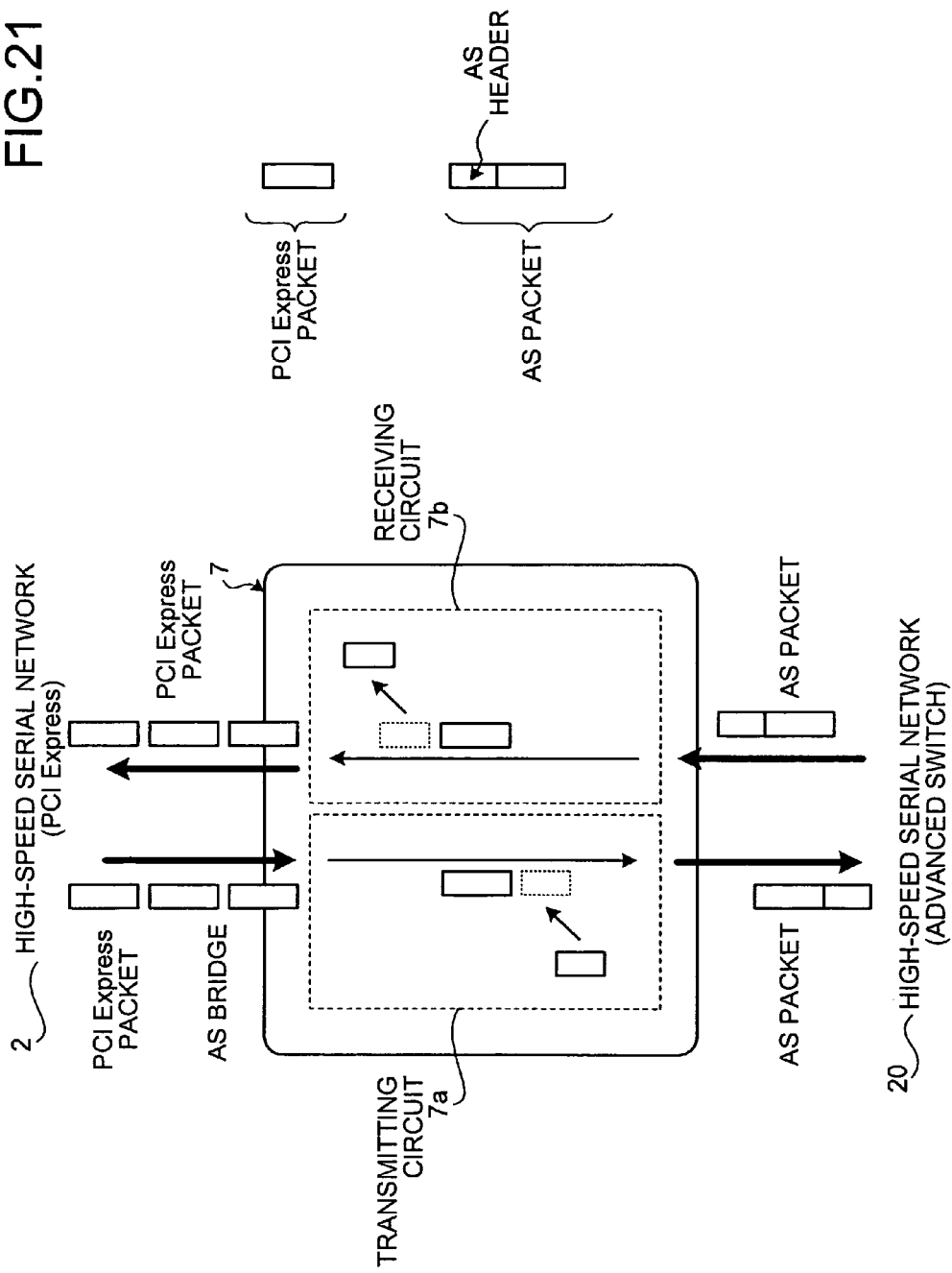
FIG. 21 is a schematic for explaining the operation of an AS bridge circuit shown in FIG. 21.

FIG. 21 is a schematic for explaining the operation of the AS bridge circuit 7. The AS bridge circuit 7 includes a transmitting circuit 7a. The transmitting circuit 7a receives a PCI Express packet from inside of the information processor 1, and attaches an AS header containing path information of an AS network 20 to the packet. The transmitting circuit 7a then outputs an AS packet to the AS network 20, with peer-to-peer connections, including a high-speed serial transmission path and a switching network according to AS standard. The AS bridge circuit 7 also includes a receiving circuit 7b. The receiving circuit 7b receives an AS packet from the AS network 20, then removes the AS header from the AS packet, and, after discarding AS header information, outputs a PCI Express packet to the PCI Express bus 2.

Figure 22:
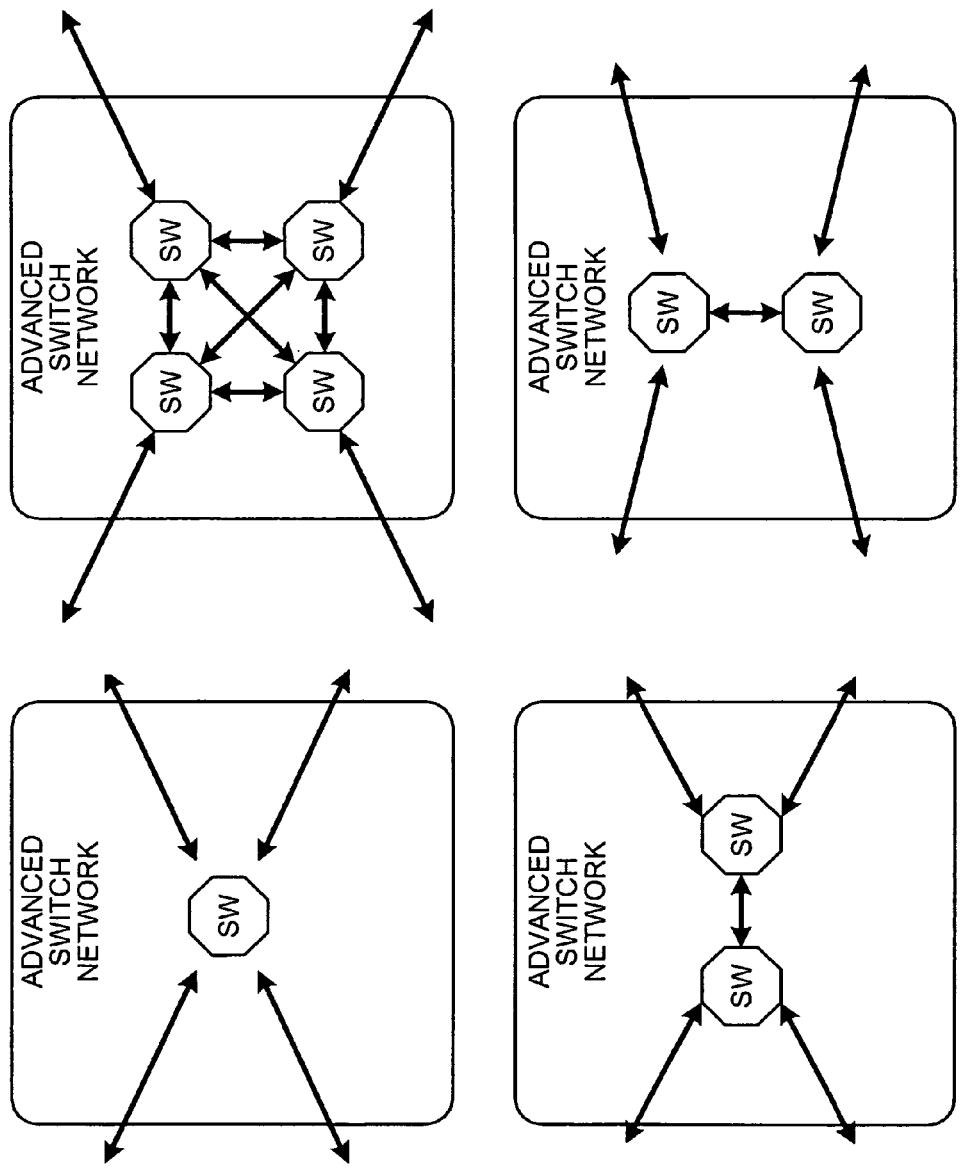
FIG. 22 is schematic for explaining a connection configuration of an AS network.

FIG. 22 is schematic for explaining a connection configuration of the AS network 20. Differently from the PCI or the PCI Express only allowing the tree structure, the AS standard accepts any topologies with a switch. For example, the star connection and the fabric connection as shown in the FIG. 22 can be employed to achieve an optimal structure depending on a communication frequency or unbalance traffic between the information processors 1. When the communication frequency or traffic is balanced, a fabric structure is preferable for avoiding path conflicts.

Configuration of the Information Processing System

An information processing system includes a plurality of the information processors 1 each having a different optional configuration. The information processors 1 are connected to each other via the AS network 20 to share optional functions (optional devices) among the information processors. That is, each of the information processors 1 can use all the functions at a high-speed as described below.

Figure 23:
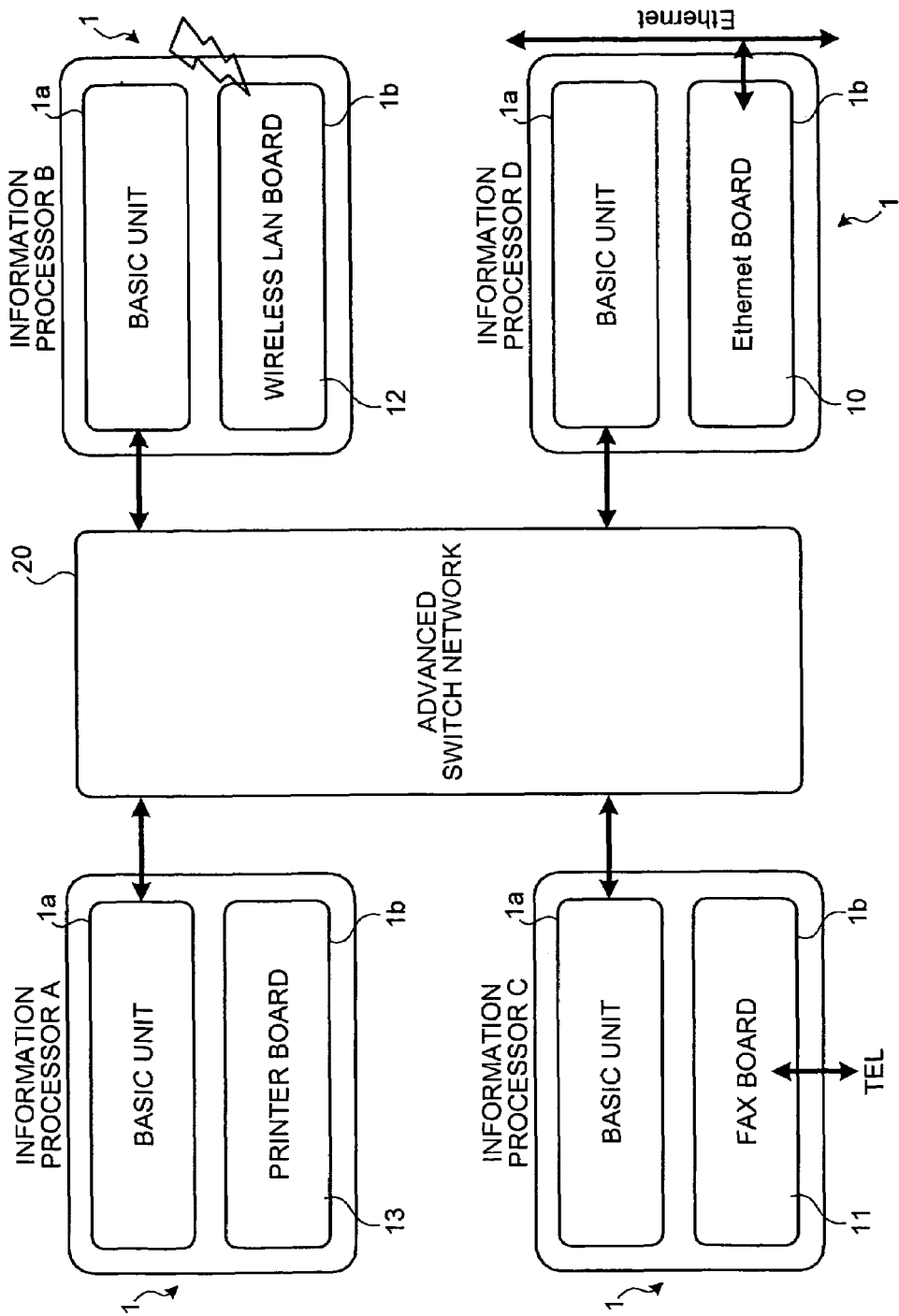
FIG. 23 is a block diagram of an example of a system that includes a plurality of information processors shown in FIG. 20.

FIG. 23 is a block diagram of an example of a system that includes a plurality of information processors 1. Four information processors 1A, 1B, 1C, and 1D each having a different optional device are connected to each other via the AS network 20. Specifically, the information processor 1A is installed with the printer board 13 as an optional board. The information processor 1B is installed with the wireless LAN board 12 for connecting to the network. The information processor 1C is installed with the FAX board 11 for connecting to a telephone line. The information processor 1D is installed with the Ethernet board 10 for connecting to the network.

Example of System Operation

The Operation of the information processing system is described below in which the controller 4 in the basic unit 1a of the information processor 1A uses a function of an optional board on the other information processor 1B, 1C, or 1D.

Figure 24:
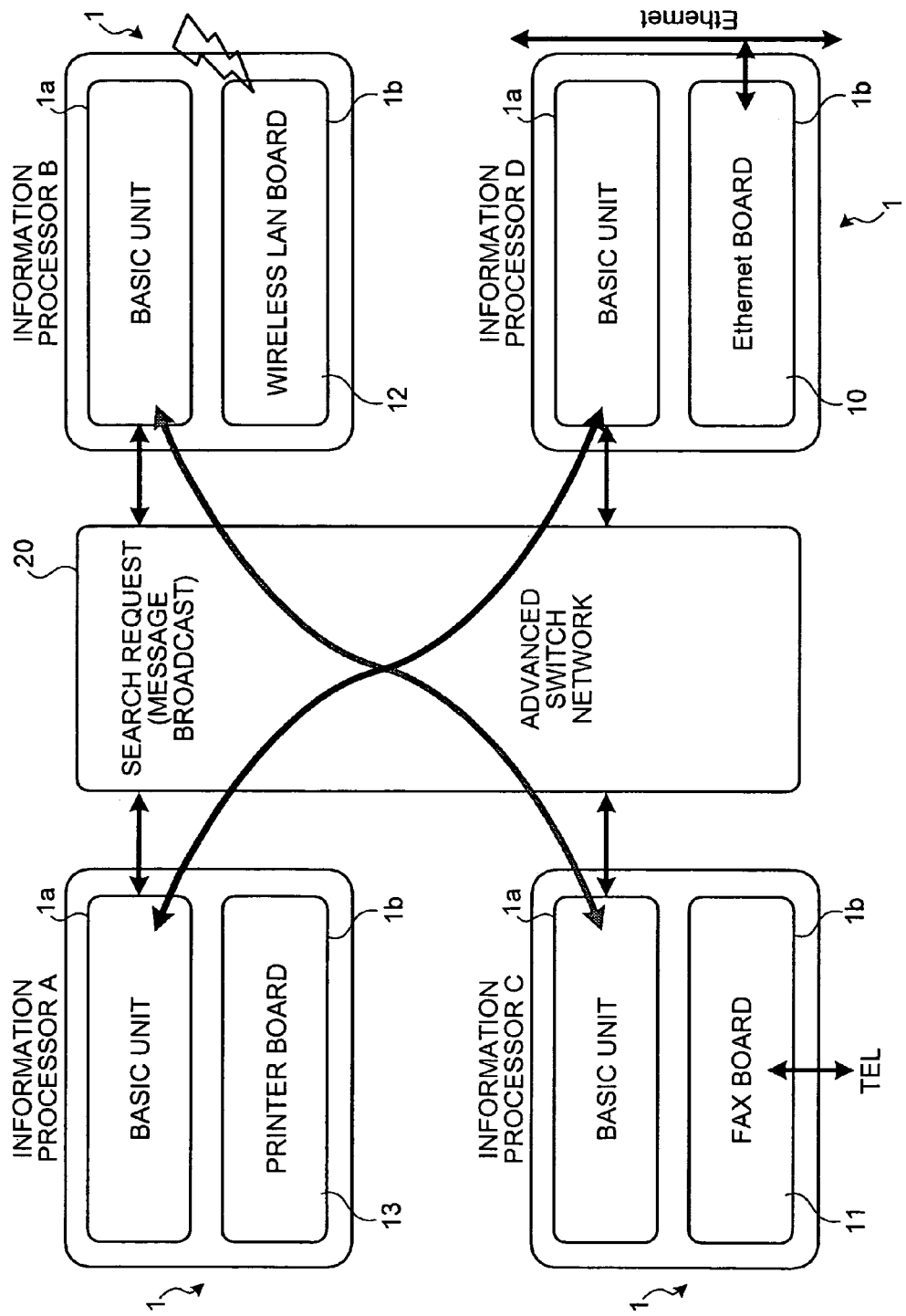
FIG. 24 is a schematic for explaining the operation of the information processor to broadcast PCI Express message packets to other information processors.

First, the controller (root complex) 4 in the information processor 1A searches for optional devices mounted on the other information processors 1B, 1C, and 1D that is communicable to the information processor 1A over the AS network. More specifically, as shown in FIG. 24, the controller 4 broadcasts a PCI Express message packet containing a search request to the other information processors 1B, 1C, and 1D. "PCI Express Base Specification Revision 1.0a" (http:www-.pcisig.com/) describes the method of sending a data packet in the form of a PCI Express message packet to downstream devices in broadcast mode. The message packet is converted into an AS packet at the AS bridge circuit 7 in the information processor 1A, and transferred to all the information processors 1B, 1C, and 1D connected to the AS network 20. The search request is sent simultaneously to all the information processors 1B, 1C, and 1D.

The message containing the search request is re-converted into the PCI Express massage packet at each of the AS bridge circuit 7 in the information processors 1B, 1C, and 1D, and sent to the controller (root complex) 4 in the basic unit 1a.

Figure 25:
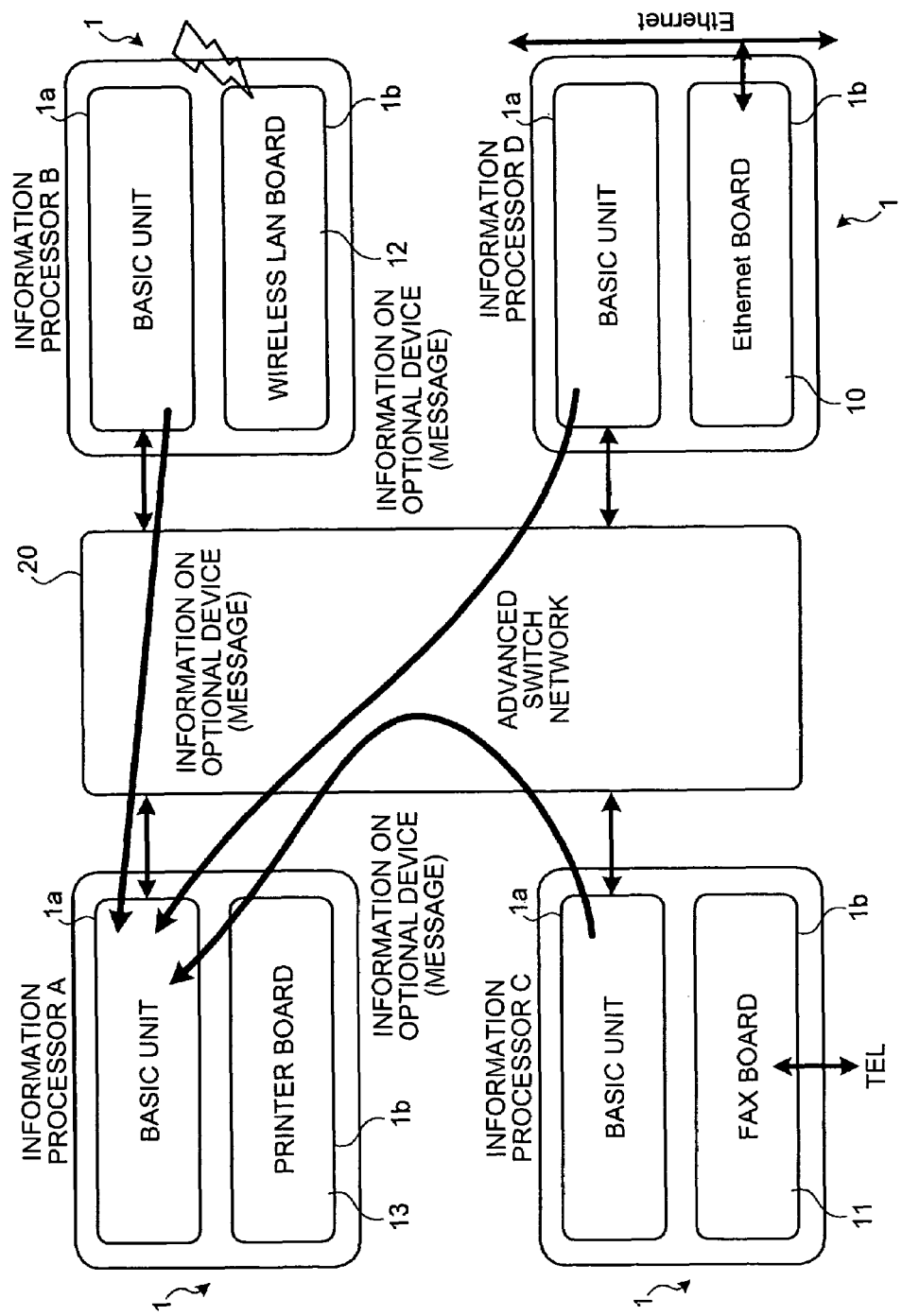
FIG. 25 is a schematic for explaining transmission of a message packet containing information on an optional device.

Having received the search request, as can be seen from FIG. 25, each of the controllers 4 of the information processors 1B, 1C, and 1D sends a message packet containing information on the optional device(s) thereof to the controller 4 of the information processor 1A.

Through the exchange of the message packets, the controller 4 in the basic unit 1a of the information processor 1A stores therein information on the optional device(s) available over the AS network 20.

The processes described above are performed at the time each of the information processors 1A, 1B, 1C, and 1D is activated, and then periodically performed to update the information on the optional device(s) of the information processors 1A, 1B, 1C, and 1D.

The information processor 1A can issue an access request via the AS network 20 to the information processor 1B, 1C, or 1D with an optional device which the information processor 1A does not possess. The issuance of the access request is described below.

Figure 26:
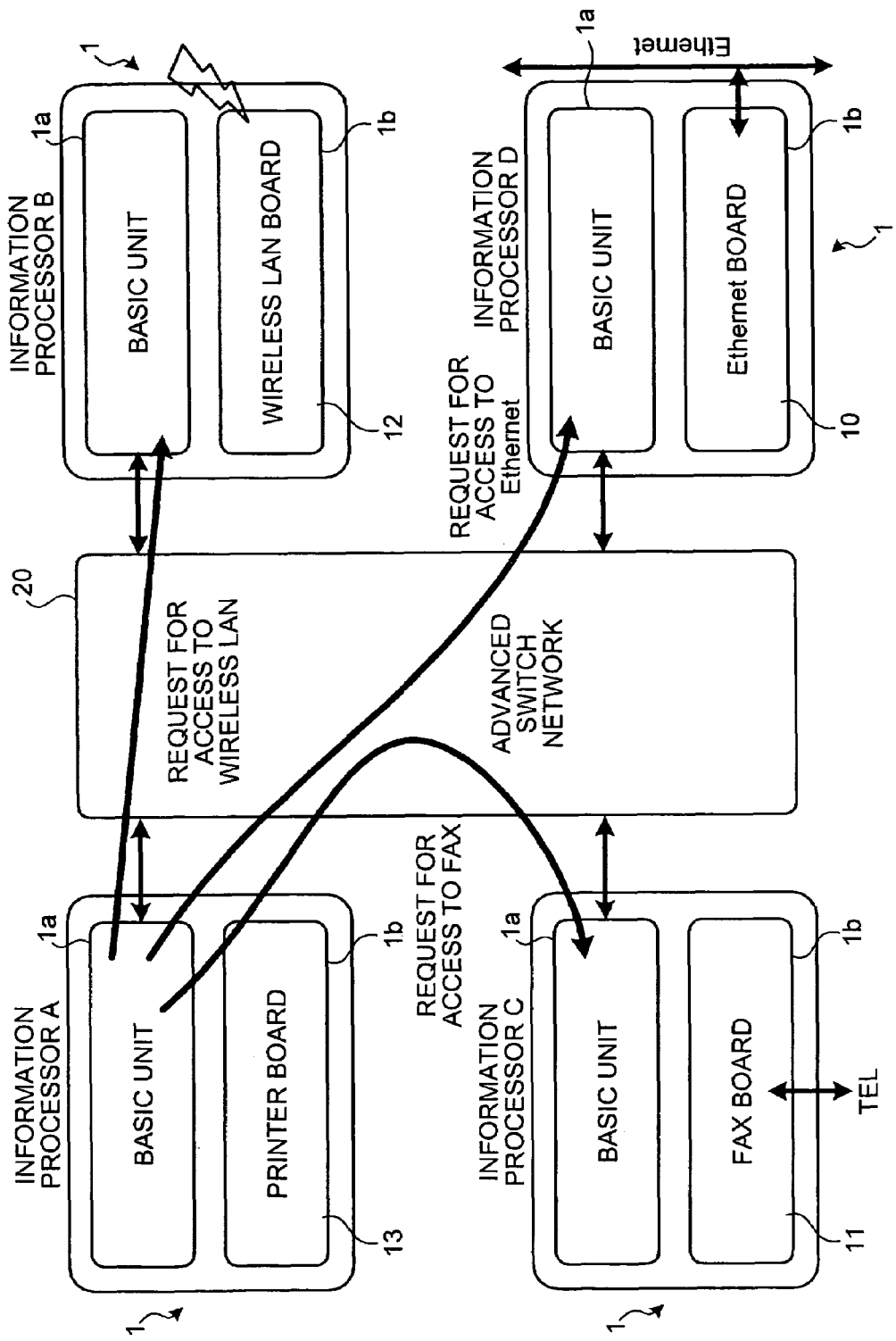
FIG. 26 is a schematic for explaining transmission of a packet for requesting access to the optional device.

The information processor 1A has already stored therein the information on which information processor 1B, 1C, or 1D is installed with a target optional device. Therefore, to notify the access request, the information processor 1A use a normal message packet addressed only to the information processor 1B, 1C, or 1D with the target optional device or a memory-write interrupt packet without using broadcast. A value for identifying the target optional device is specified in the message packet or the memory write data. In an example shown in FIG. 26, the information processor 1A sends a packet for requesting access to the wireless LAN unit to the information processor 1B, a packet for requesting access to the FAX unit to the information processor 1C, and a packet for requesting access to the Ethernet unit to the information processor 1D.

Figure 27:
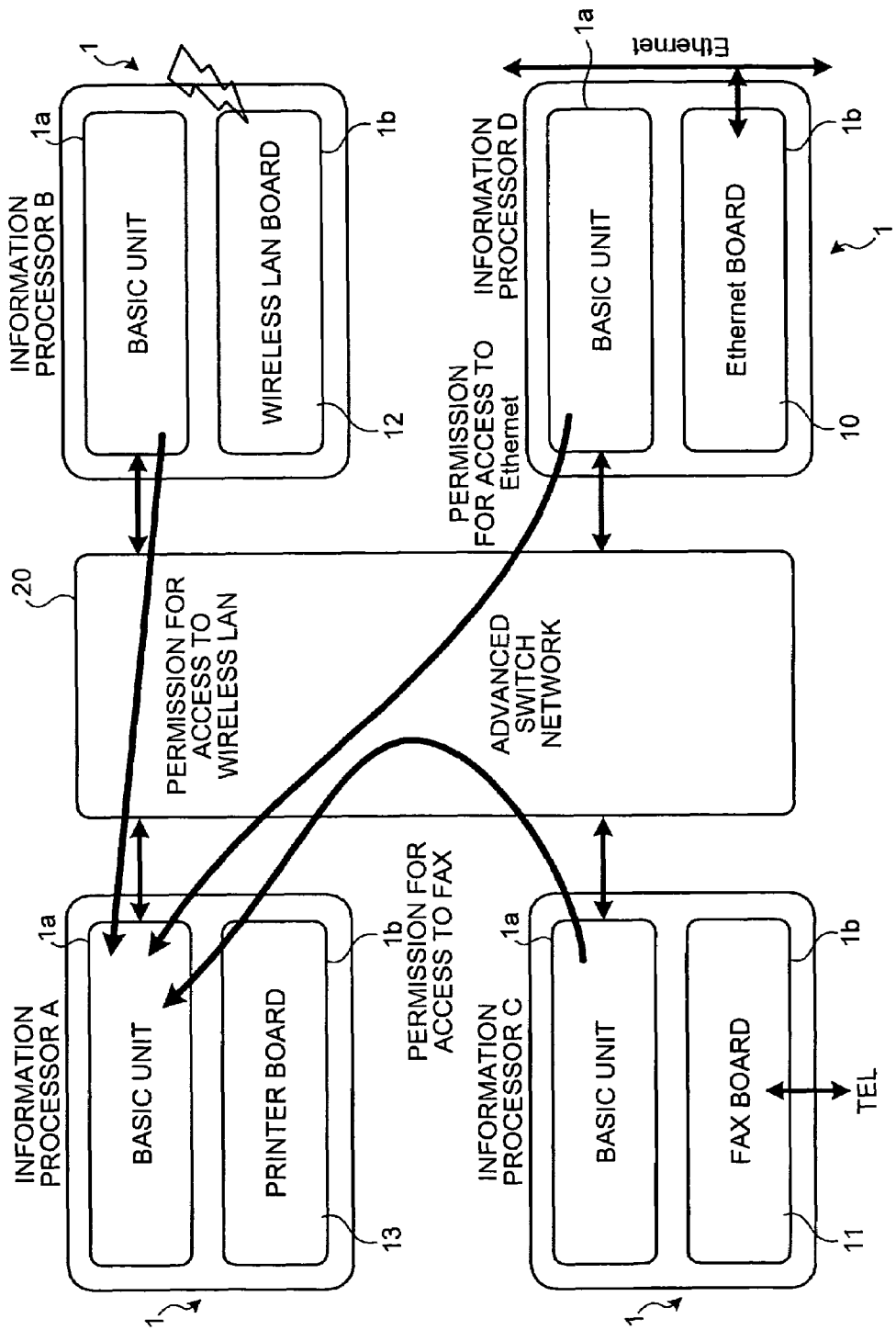
FIG. 27 is a schematic for explaining issuance of a notice of permission for access to the optional device.

As can be seen from FIG. 27, having received the packet containing the access request from the information processor 1A over the AS network 20, each of the information processors 1B, 1C, and 1D accepts the request when the target optional device is idle or with a light load, and notifies the information processor 1A of a permission for access to the target optional device as an available resource.

To notify the requestor, i.e., the information processor 1A, of the permission for access, the permitter, i.e., the information processor 1B, 1C, or 1D with the target optional device, sends a message packet or a memory-write interrupt packet to the requestor. To establish a connection between the requester and the target optional device, the message packet and the memory write data contain an IO address and a memory address to be accessed.

The requestor receives the permission for access to the target optional device from the permitter.

The requestor establishes a connection to the target optional device of the permitter based on the information such as the IO address or the memory address contained in the message packet or the memory write data, so that the requestor can use the function belonging to the permitter as if the function belonged to the requestor.

When the permitter uses the optional device belonging thereto, which the requestor is permitted to access, the permitter sends a message packet or a memory-write interrupt packet to notify the requestor of canceling the permission for access. When the requester receives the notice of the permission cancel, the requester suspends an on-going image data process at a suitable time such as when a process for a page is completed, and notifies the permitter of accepting the cancel request. The permitter performs, after receiving the notification from the requester, a process with the relevant optional device. After the process is ended, the permitter sends the permission for access to the requestor again. The requester resumes the suspended process when receiving the permission for access. The message packet or the memory-write interrupt packet is also used for the above operation.

Thus, the information processor 1A that is installed with only the printer board as an optional device can use functions of another optional device mounted on another information processor 1B, 1C, or 1D such as the wireless LAN board, the FAX board, or the Ethernet board.

In the same manner as described above, each of the information processors 1B, 1C, and 1D can also issue the request for access to an optional device belonging to another information processor 1, and perform a process while sharing the optional device with the others.

As described above, according to the first embodiment of the present invention, the information processor 1A searches the AS network 20 for optional devices mounted on the other information processors 1B, 1C, and 1D, issues a request for access to a target optional device, obtains a permission for access to the target optional device from the information processor 1B, 1C, or 1D which has received the request, and performs a process with the target optional device of the information processor 1B, 1C, or 1D. Thus, the information processor 1A can perform a process requiring an optional device which is not installed in the information processor 1A. In addition, there is no need to install the same optional device in each information processor, which results in cost reduction. Moreover, no complicated operation is required to selectively use a plurality of information processors depending on desired jobs, which improves the usability and convenience of the information processor.

Figure 28:
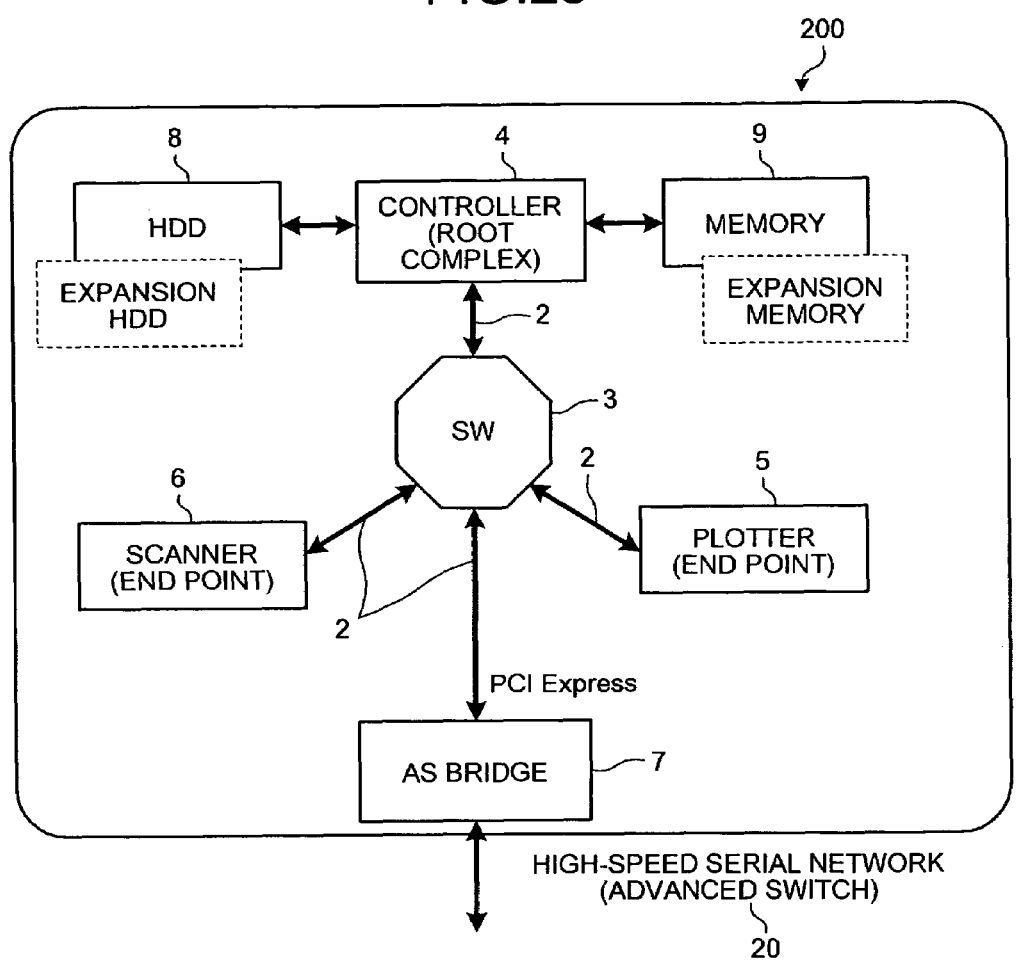
FIG. 28 is a schematic block diagram of an example of an information processor according to a second embodiment of the present invention.

A second embodiment is described below with reference to FIGS. 28 to 33. FIG. 28 is a block diagram of an information processor 200 according to the second embodiment of the present invention. The information processor 200 shown in FIG. 28 is in many respects similar to the information processor 1 of FIG. 20, and like reference numerals are utilized in designating corresponding portions. The information processor 200 is applied to MFP or the like as with the information processor 1. The information processor 200 includes the PCI Express buses 2, the switch 3, the controller 4 as a root complex, the plotter 5, and the scanner 6. The PCI Express buses 2 are high-speed serial buses serve as internal data buses. The controller 4 is connected via the switch 3 to the plotter 5 and the scanner 6, both being end points.

The controller 4 includes the CPU for controlling the entire system according to programs (software) installed in the information processor 200, and functions as the printer controller for performing such process as path control and path determination. The controller 4 is connected to storing devices such as a HDD (expansion HDD) 8 and a memory (expansion memory) 9 via a dedicated interface.

The information processor 200 further includes the AS bridge circuit 7 as a bridge section, which is connected to the controller 4 via the switch 3. The AS bridge circuit 7 converts between a PCI Express (protocol) packet inside the information processor 1 and an AS (protocol) packet when inputting and outputting packets.

Configuration of the Information Processing System

An information processing system includes a plurality of the information processors 200, each including the storing devices (the HDD 8 and the memory 9). The information processors 200 are connected to each other via the AS network 20, and share available spaces of the storing devices among them. This improves performance of printing which requires a large amount of image data to be stored as described below.

Figure 29:
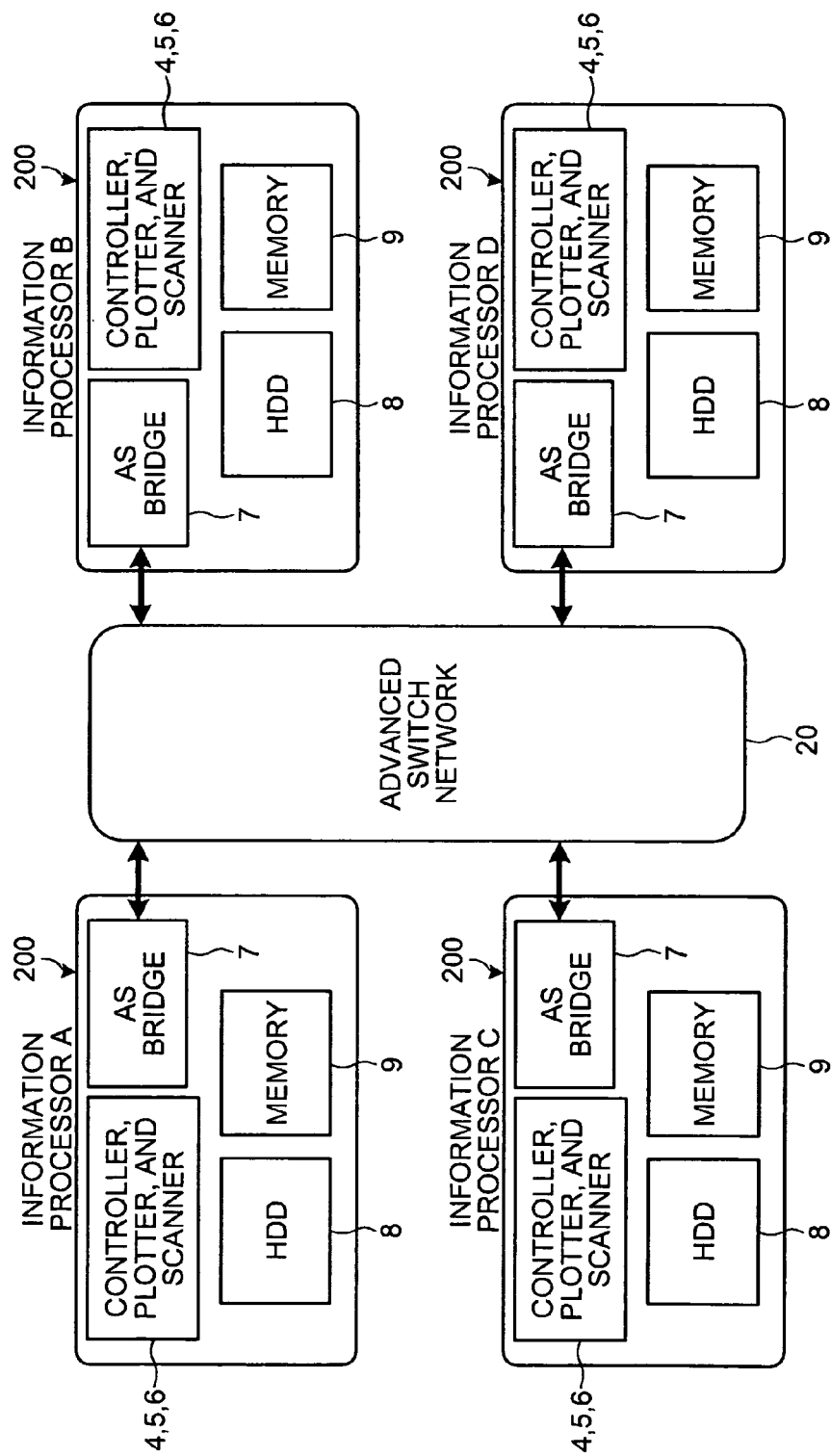
FIG. 29 is a block diagram of an example of a system that includes a plurality of information processors shown in FIG. 28.

FIG. 29 is a block diagram of an example of a system that includes a plurality of information processors 200. Four information processors 200A, 200B, 200C, and 200D, each including the storing devices, are connected to each other via the AS network 20.

Operation Example in the System

The Operation of the information processing system is described below in which the controller 4 of the information processor 200A performs a process through which a large amount of image data is temporarily stored in an available space of a storing device mounted on the other information processor 200B, 200C, or 200D.

Figure 30:
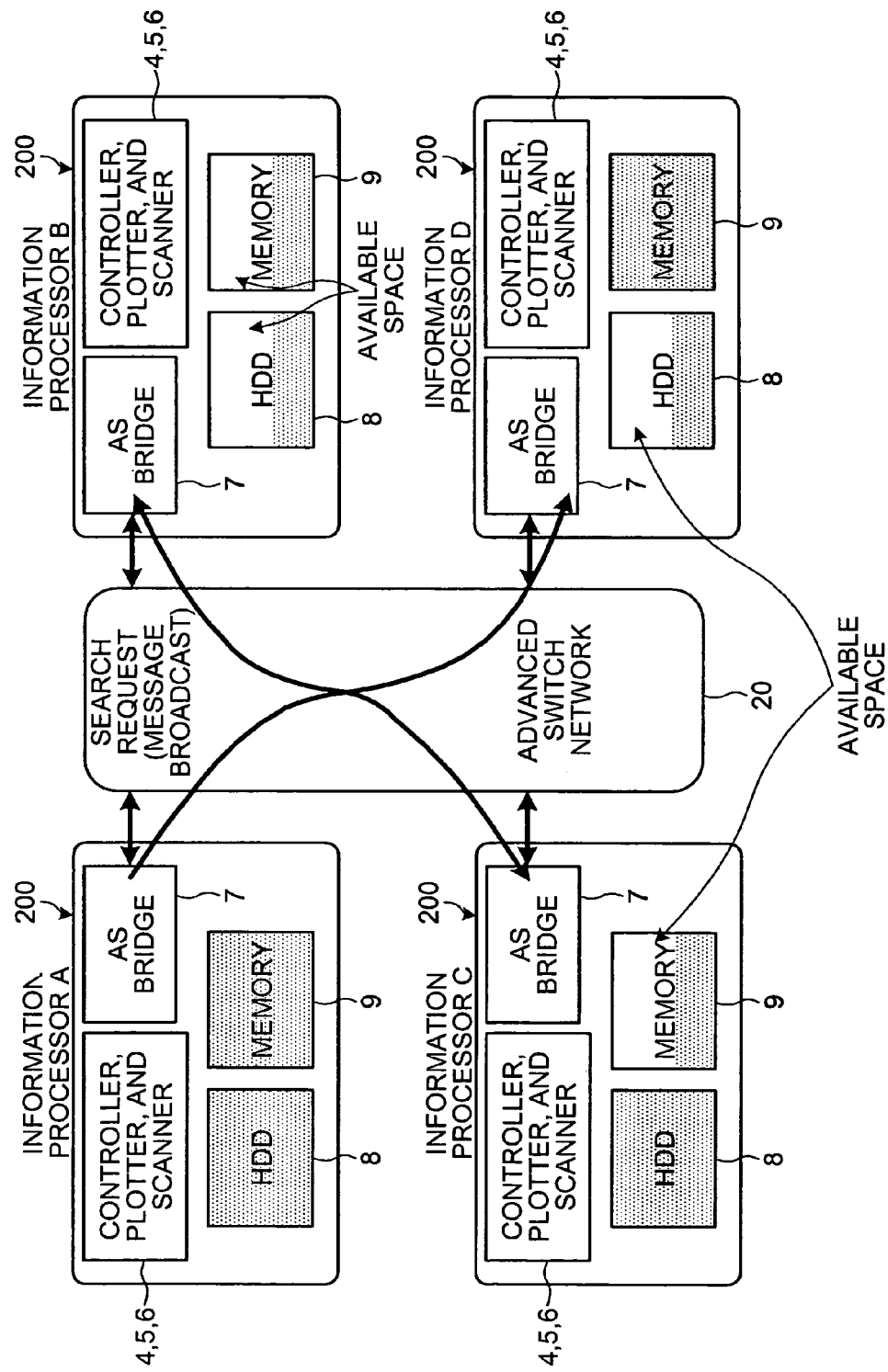
FIG. 30 is a schematic for explaining the operation of the information processor to broadcast PCI Express message packets to other information processors.

First, the controller (root complex) 4 of the information processor 200A searches for an available space in the storing devices (the HDD 8 and the memory 9) mounted on the other information processors 200B, 200C, and 200D that is communicable to the information processor 200A over the AS network. More specifically, as shown in FIG. 30, the controller 4 of the information processor 200A broadcasts a PCI Express message packet containing a search request to the other information processors 200B, 200C, and 200D. "PCI Express Base Specification Revision 1.0a" (http:www.pcisig.com/) describes the method of sending a data packet in the form of a PCI Express message packet to a downstream device in broadcast mode. The message packet is converted into an AS packet at the AS bridge circuit 7 of the information processor 200A, and transferred to all the information processors 200B, 200C, and 200D connected to the AS network 20. The search request is sent simultaneously to all the information processors 200B, 200C, and 200D.

The message containing the search request is re-converted into the PCI Express massage packet at each of the AS bridge circuits 7 in the information processors 200B, 200C, and 200D, and sent to the controller (root complex) 4.

Figure 31:
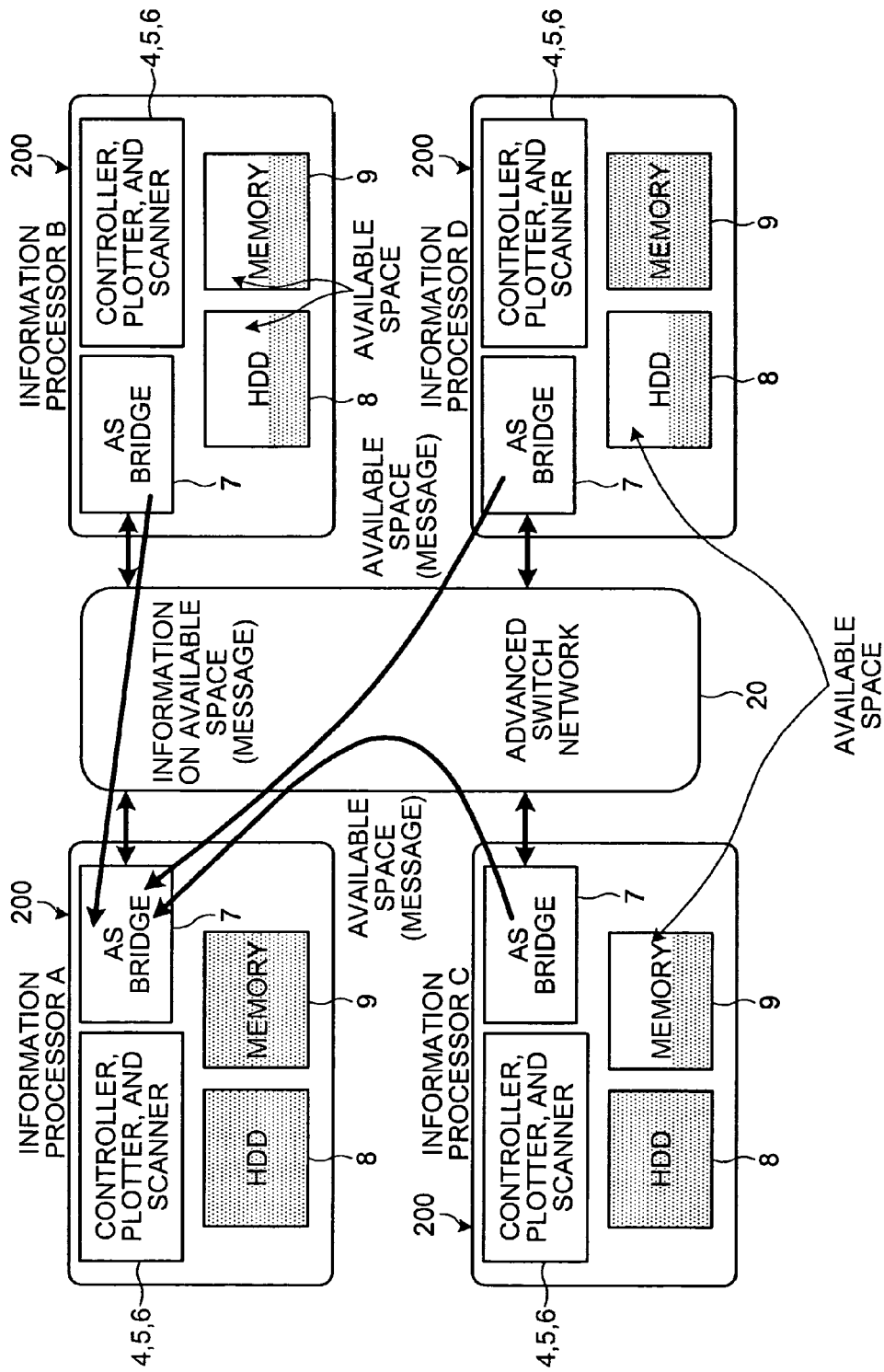
FIG. 31 is a schematic for explaining transmission of a message packet containing information on an available capacity in a storing device.
Figure 32:
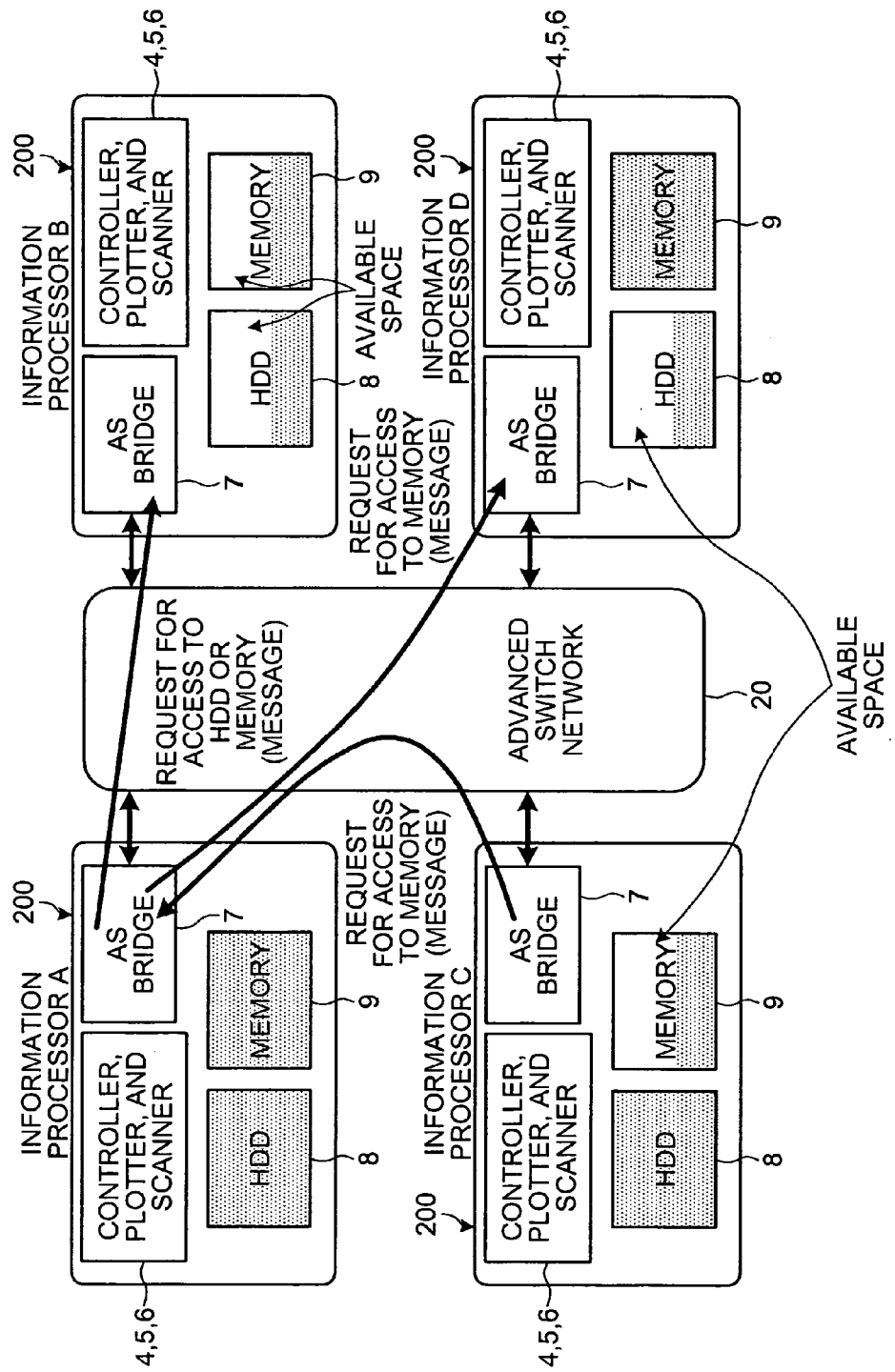
FIG. 32 is a schematic for explaining transmission of a packet for requesting access to an available space in a storing device shown in FIG. 28.

Having received the search request, as can be seen from FIG. 31, each of the controllers 4 of the information processors 200B, 200C, and 200D sends a message packet containing information on the available space in the storing devices (the HDDs 8 and the memories 9) thereon to the controller 4 of the information processor 200A.

Through the exchange of the message packets, the controller 4 of the information processor 200A stores therein information on the available space in each of the storing devices, which can be accessed through the AS network.

The processes described above are performed at the time each of the information processors 200A, 200B, 200C, and 200D is activated, and then periodically performed to update the information on the available space in the storing devices of the information processors 200A, 200B, 200C, and 200D.

The information processor 200A issues, via the AS network 20, a request for access to the available space in the storing device (the HDD 8 or the memory 9) to the other information processor 200B, 200C, or 200D, when the storing device (the HDD 8 or the memory 9) of the information processor 200A is short in capacity. The issuance of the access request is described below in details.

By searching for an available space in the storing devices, the information processor 200A has already stored information on the size of the available space in the storing devices of the information processors 200 on the AS network 20. Therefore, to send the access request, the information processor 200A uses a normal message packet addressed only to the information processor 200B, 200C, or 200D with the target storing device or a memory-write interrupt packet without using broadcast. The message packet or the memory write data specifies a necessary capacity to the target storing device. With the transactions, the access request is sent without fail to the other information processor 200B, 200C, or 200D with the target storing device on the network. In an example shown in FIG. 32, the information processor 200A sends a packet for requesting access to the HDD 8 and the memory 9 to the information processor 200B, a packet for requesting access to the memory 9 to the information processor 200C, and a packet for requesting access to the HDD 8 to the information processor 200D.

Figure 33:
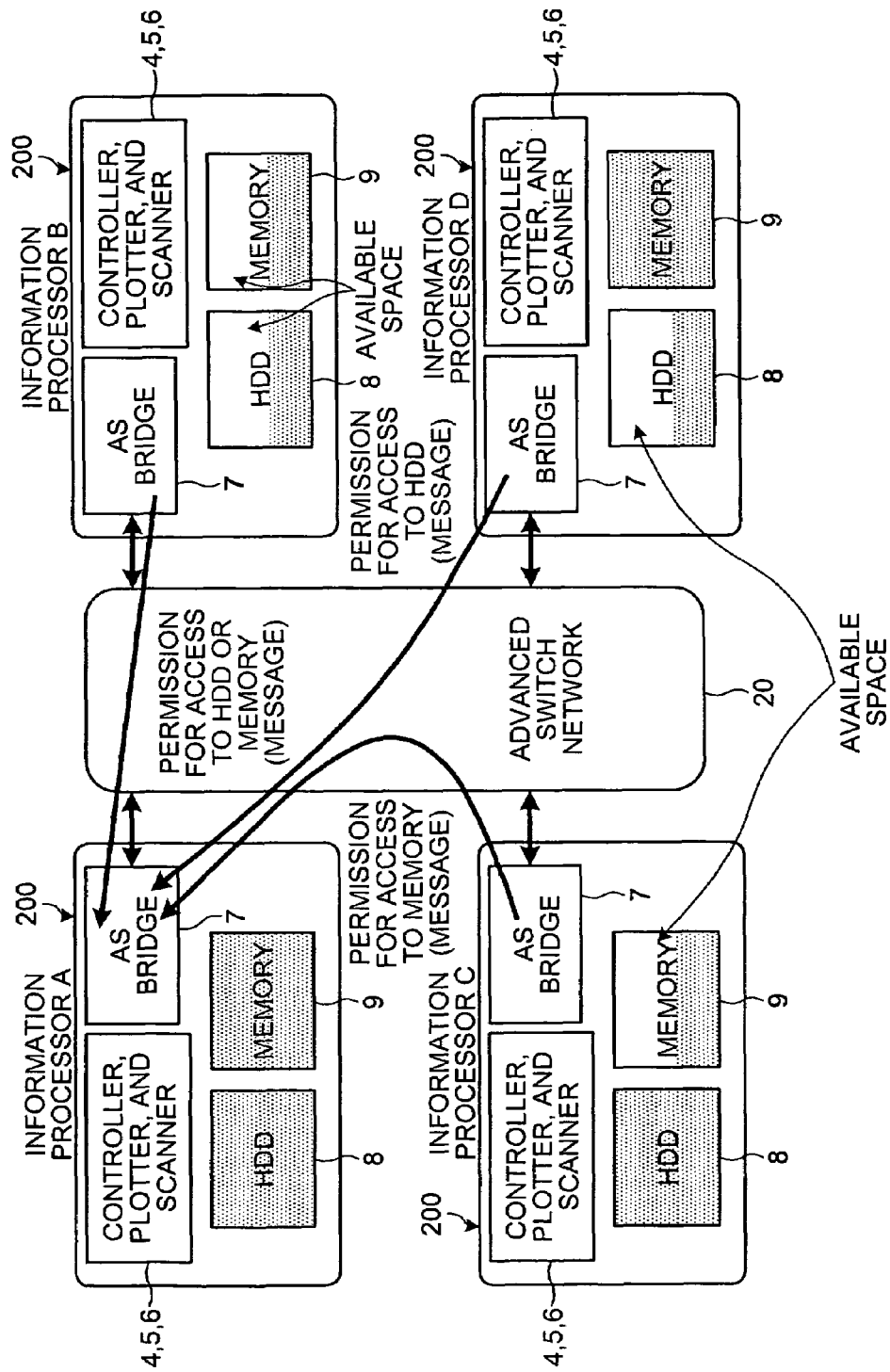
FIG. 33 is a schematic for explaining issuance of a notice of permission for access to the storing device.
Figure 34:
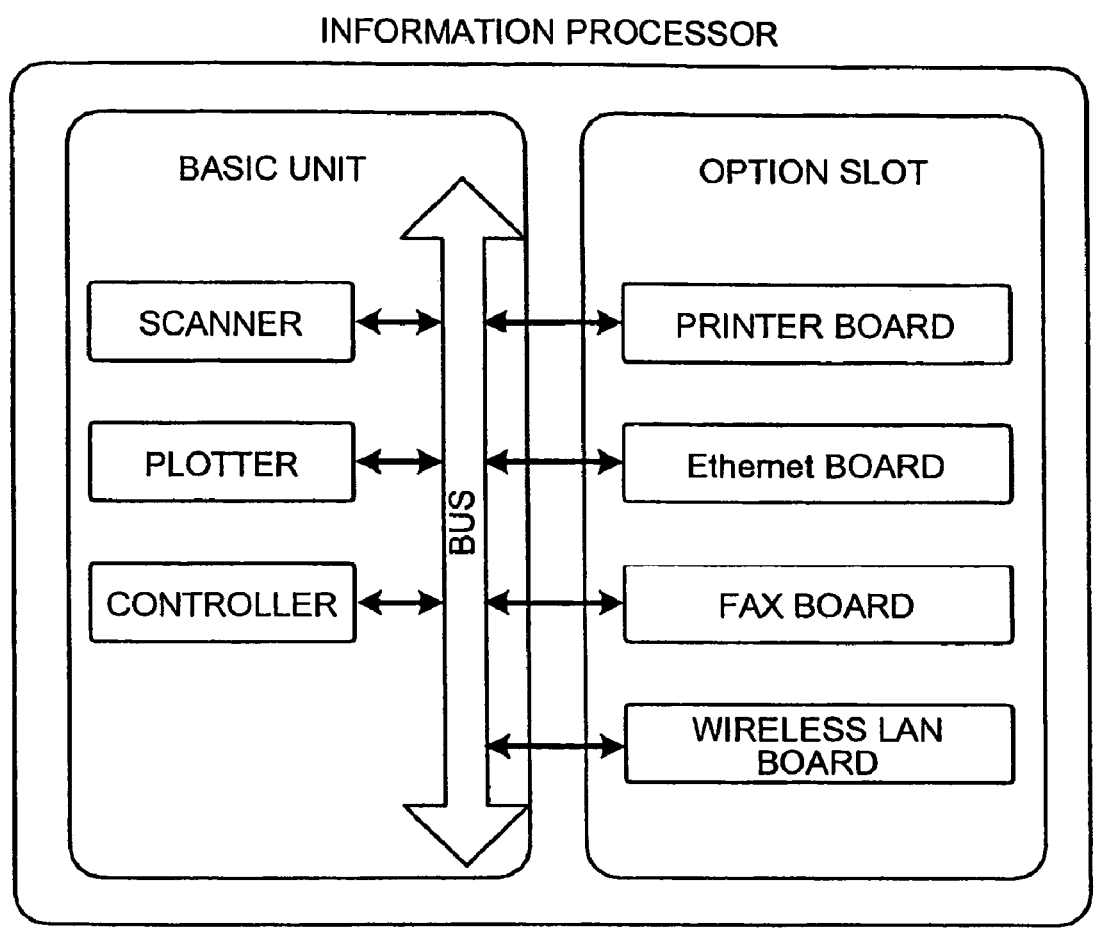
FIG. 34 is a schematic block diagram of an example of a conventional information processor.
Figure 35:
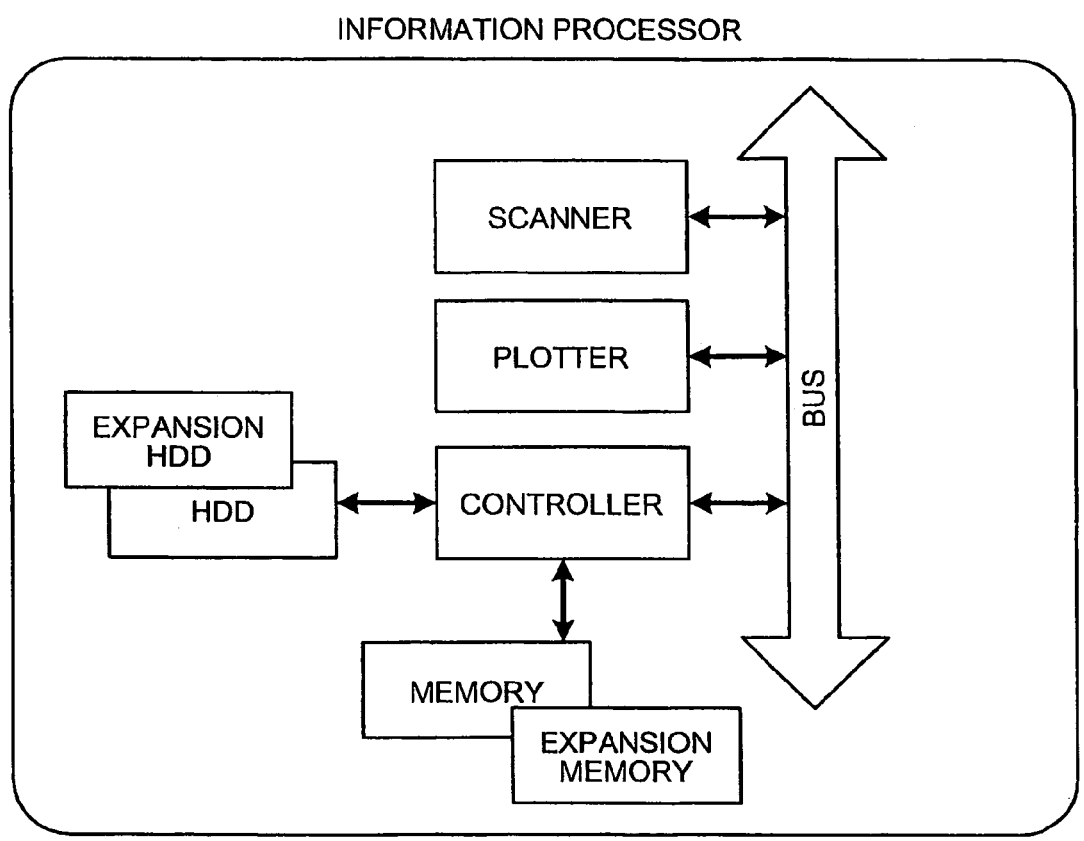
FIG. 35 is a schematic block diagram of another example of a conventional information processor.
Figure 36:
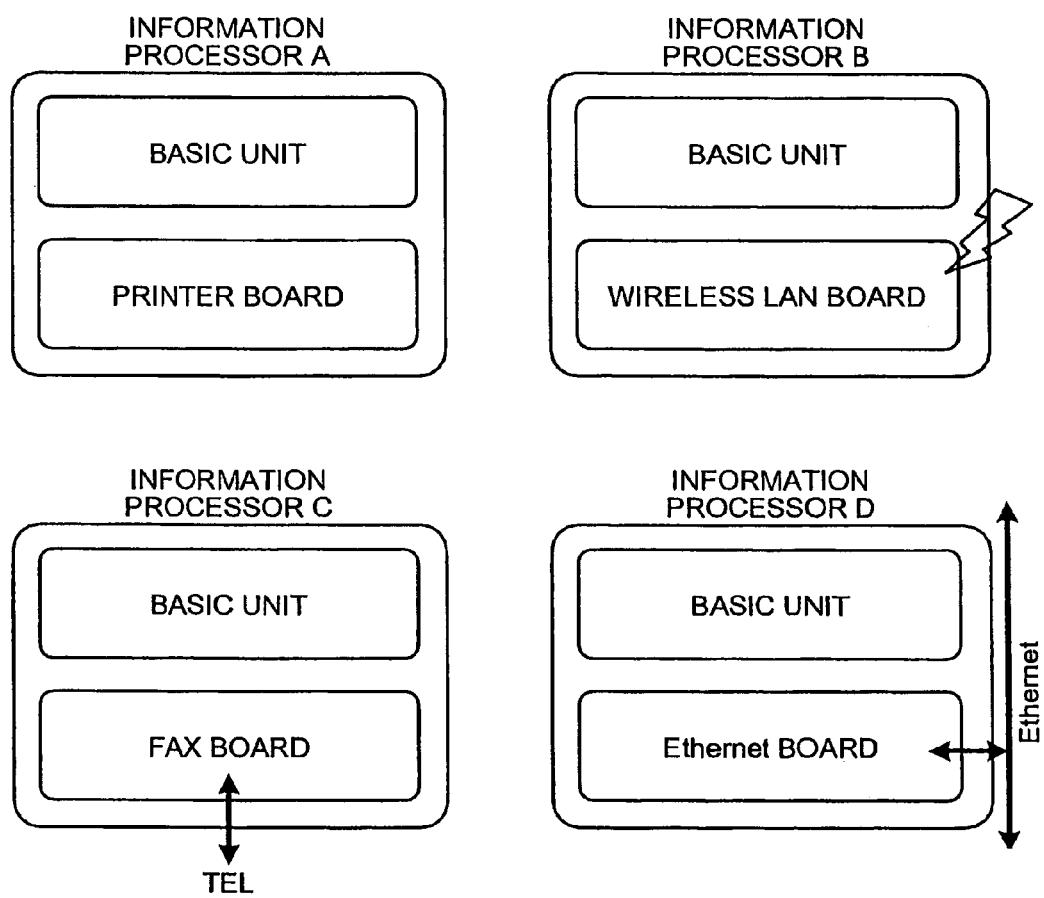
FIG. 36 is a schematic block diagram of another example of a conventional information processor.

As can be seen from FIG. 33, having received the packet for requesting access from the information processor 200A over the AS network 20, each of the information processors 200B, 200C, and 200D accepts the request when the target storing device has a sufficient available space, and notifies the information processor 200A of a permission for access to the target storing device as an available resource.

To notify the requester, i.e., the information processor 200A, of the permission for access, the permitter, i.e., the information processor 200B, 200C, or 200D with the target storing device, sends a message packet or a memory-write interrupt packet to the requester. To establish a connection between the requester and the target storing device, the message packet and the memory write data contain an IO address and a memory address to be accessed.

The requestor receives the permission for access to the available space of the target storing device from the permitter.

The requestor establishes a connection to the target storing device of the permitter based on the information such as the IO address or the memory address contained in the message packet or the memory write data, so that the requester can perform an information process using the space of the storing device of the permitter, as its own storing device For example, the requestor can perform a printing job with the plotter 5 during which the jam backup data is temporarily stored in the storing area of the storing device of the permitter.

For another example, the requestor can perform integrated printing to print a plurality of images on one sheet during which the storing area of the storing device of the permitter is temporarily used for an image expansion area.

For still another example, the requestor can perform an electronic sorting during which the storing area of the storing device of the permitter is temporarily used for an image expansion area.

For further another example, the requestor can perform a synthesis process of a plurality of image data during which the storing area of the storing device of the permitter is temporarily used for an image expansion area.

When the permitter uses the space of the storing device, which the requester is permitted to access, the permitter sends a message packet or a memory-write interrupt packet to notify the requestor of canceling the permission for access. When the requestor receives the notice of the permission cancel, the requestor suspends an on-going image data process at a suitable time such as when a process for a page is completed, and notifies the permitter of accepting the cancel request. The permitter performs, after receiving the notification from the requestor, a process with the space of the relevant storing device. After the process is ended, the permitter sends the permission for access to the requestor again. The requestor resumes the suspended process when receiving the permission for access. The message packet or the memory-write interrupt packet is also used for the above operation.

Thus, the information processor 200A can perform a process, which requires an amount of capacity exceeding available spaces of the storing devices thereof, by using available spaces of the other storing devices of the information processors 200B, 200C, and 200D. Also, the process can be performed at a higher speed because the size of data processed at a time increases.

In the same manner as described above, each of the information processors 200B, 200C, and 200D can also issue the request for access to a storing device belonging to another information processor 200, and perform a process while sharing the storing device.

As described above, according to the second embodiment of the present invention, the information processor can perform a process, which requires a memory capacity exceeding that available in the information processor 200 alone, using an available space of the storing device of another information processor via the AS network 20 without increasing its own memory capacity. Also, the process can be performed at a higher speed because the size of data that can be processed at a time increases. Moreover, the information processor with a low capacity storing device can perform as high as that with a higher capacity storing device, i.e., with an expansion storing device added thereon. Furthermore, there is no need to install an additional storing device, which results in cost reduction.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processor that is connected to at least one other information processor that includes a storage unit via a network, the information processor comprising:
    a free-space detecting unit that detects available space in the storage unit of the other information processor;
    a request issuing unit that issues an access request to use the available space to the other information processor;
    a permission receiving unit that receives an access permission for access to the available space from the other information processor;
    an information processing unit that performs information processing using the available space; and
    an available space information storing unit that stores information of the available space detected by the free-space detecting unit.

2. The information processor according to claim 1, further comprising a process suspending unit that suspends, when receiving information on cancellation of the access permission from the other information processor, a process being executed at an appropriate time point, and notifies the other information processor of acceptance of the cancellation.

3. The information processor according to claim 1, wherein the network is a peer-to-peer connection network that includes a communication network and a high-speed serial transmission path based on the Advanced Switching standard, the information processor further comprising:
    a PCI Express bus; and
    a bridge that converts a PCI Express packet into an Advanced Switching packet to output the Advanced Switching packet to the network, and converts an Advanced Switching packet received from the network into a PCI Express packet.

4. The information processor according to claim 3, wherein the free-space detecting unit broadcasts a PCI Express message packet containing a search request.

5. The information processor according to claim 3, wherein the request issuing unit sends the other information processor any one of a message packet and a memory-write interrupt packet, each containing the access request and addressed only to the other information processor with available space in the storage unit.

6. The information processor according to claim 5, wherein the memory-write interrupt packet contains information on the storage unit to be used and an amount of space in the storage unit required for the information processing.

7. The information processor according to claim 1, wherein the information processing unit uses the available space to store paper-jam backup data when performing printing.

8. The information processor according to claim 1, wherein the information processing unit uses the available space to process data for integrated printing.

9. The information processor according to claim 1, wherein the information processing unit uses the available space to process data for electronic sorting.

10. The information processor according to claim 1, wherein the information processing unit uses the available space to process data for producing a composite image from a plurality of images.

11. The information processor according to claim 1, wherein the access permission includes an Input/Output address and a memory address corresponding to the storage unit of the at least one other information processor.

12. The information processor according to claim 1, wherein the free-space detecting unit is configured to broadcast a search request from the information processor to the other information processor to detect the available space in the storage unit of the other information processor.

13. A method of storing information of detected available space by an information processor in a network including at least one other information processor that is connected to the information processor, the method comprising:
    detecting, by a free-space detecting unit, available space in a storage unit of the at least one other information processor;
    issuing, by a request issuing unit, an access request to the other information processor to use the available space;
    receiving, by a permission receiving unit, an access permission for access to the available space from the other information processor;
    processing, by an information processing unit, information using the available space; and
    storing, by an information storing unit in the information processor, information of the detected available space.

14. The information processing method according to claim 13, wherein
    the detecting, issuing, receiving, processing and storing is conducted when at least one of the information processors is activated and periodically.

* * * * *